United States Patent
Hasija et al.

(10) Patent No.: US 10,261,677 B2
(45) Date of Patent: *Apr. 16, 2019

(54) INTEGRATION OF CLOUD-BASED SERVICES TO CREATE CUSTOM BUSINESS PROCESSES

(71) Applicant: Azuqua, Inc., Seattle, WA (US)

(72) Inventors: Nikhil Hasija, Bellevue, WA (US); Craig Howard Unger, Bellevue, WA (US)

(73) Assignee: Azuqua, Inc., Seattle, WA (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/953,821

(22) Filed: Nov. 30, 2015

(65) Prior Publication Data

US 2016/0253079 A1    Sep. 1, 2016

Related U.S. Application Data

(63) Continuation of application No. 14/633,003, filed on Feb. 26, 2015, now Pat. No. 9,203,707.

(51) Int. Cl.
*G06F 15/173* (2006.01)
*G06F 3/0484* (2013.01)
(Continued)

(52) U.S. Cl.
CPC ........ *G06F 3/04847* (2013.01); *G06F 3/0482* (2013.01); *G06F 8/31* (2013.01);
(Continued)

(58) Field of Classification Search
CPC ....... H04L 41/50; H04L 41/0823; G06F 8/34; G06F 17/30893; G06F 8/30; H04N 21/458
(Continued)

(56) References Cited

U.S. PATENT DOCUMENTS

2007/0100959 A1   5/2007   Eichstaedt et al.
2010/0037157 A1*  2/2010   Chang ..................... G06F 8/36
                                                      715/764
(Continued)

OTHER PUBLICATIONS

Braga, D.; Ceri, S.; Daniel, F.; Martinenghi, D., "Mashing Up Search Services," Internet Computing, IEEE , vol. 12, No. 5, pp. 16,23, Sep.-Oct. 2008.*

(Continued)

*Primary Examiner* — Taylor A Elfervig
(74) *Attorney, Agent, or Firm* — John W. Branch; Lowe Graham Jones PLLC

(57) ABSTRACT

Embodiments are directed towards integrating cloud-based services to create custom business processes. A process flow may be generated to perform a custom business process. The process flow may include service channels such that the service channels are coupled together by flow fields to create a custom business process. If event information is provided, one or more service channels may be determined or based on the event information and configuration information associated with the service channels. The event information may be provided to one or more input flow fields of the service channels. Result information may be generated by the service channels based on the event information and the configuration information. The result information may be provided to output flow fields of the service channels. Also, the result information may be forwarded to input flow fields of a next service channel.

23 Claims, 15 Drawing Sheets

(51) Int. Cl.
*H04L 12/24* (2006.01)
*G06F 3/0482* (2013.01)
*H04L 29/08* (2006.01)
*G06F 8/30* (2018.01)
*H04N 21/458* (2011.01)
*G06Q 10/06* (2012.01)

(52) U.S. Cl.
CPC ...... *H04L 41/0813* (2013.01); *H04L 41/0823* (2013.01); *H04L 41/22* (2013.01); *H04L 41/50* (2013.01); *H04L 41/5041* (2013.01); *H04L 67/10* (2013.01); *G06Q 10/06* (2013.01); *H04N 21/458* (2013.01)

(58) Field of Classification Search
USPC .......................................................... 709/223
See application file for complete search history.

(56) References Cited

U.S. PATENT DOCUMENTS

| | | | |
|---|---|---|---|
| 2010/0125826 A1 | 5/2010 | Rice et al. | |
| 2011/0289439 A1* | 11/2011 | Jugel .................. | G06F 8/34 715/771 |
| 2013/0073993 A1* | 3/2013 | Schimpf ............... | G06F 8/38 715/762 |
| 2014/0047351 A1 | 2/2014 | Cui et al. | |

OTHER PUBLICATIONS

M. Cameron Jones , Elizabeth F. Churchill, "Conversations in Developer Communities: A Preliminary Analysis of the Yahoo! Pipes Community", 2009, In Proceedings of the Fourth International Conference on Communities and Technologies, p. 195-204.*
E. M. Maximilien, A. Ranabahu and K. Gomadam, "An Online Platform for Web APIs and Service Mashups," in IEEE Internet Computing, vol. 12, No. 5, pp. 32-43, Sep.-Oct. 2008.*
Peng et al., "Optimization of media processing workflows with adaptive operator behaviors", 2007, p. 245-272, Multimedia Tools and Application, vol. 33, Issue 3 (Year: 2007).*
M. Zakova, P. Kremen, F. Zelezny and N. Lavrac, "Automating Knowledge Discovery Workflow Composition Through Ontology-Based Planning," in IEEE Transactions on Automation Science and Engineering, vol. 8, No. 2, pp. 253-264, Apr. 2011. (Year: 2011).*
Yue et al. , "Semantics-based automatic composition of geospatial Web service chains", 2006, Computers & Geosciences, vol. 33, Issue 5, p. 649-665 (Year: 2007).*
Jin Yu; Benatallah, B.; Casati, F.; Daniel, F., "Understanding Mashup Development," in Internet Computing, IEEE, vol. 12, No. 5, pp. 44-52, Sep.-Oct. 2008.
Cinzia Cappiello, Maristella Matera, Matteo Picozzi, Gabriele Sprega, Donato Barbagallo, Chiara Francalanci, "DashMash: A Mashup Environment for End User Development", 2011, Web Engineering: 11th International Conference, ICWE 2011, Paphos, Cyprus, Jun. 20-24, 2011, pp. 152-166.
Rosenberg, F.; Curbera, F.; Duftler, M.J.; Khalaf, R., "Composing RESTful Services and Collaborative Workflows: A Lightweight Approach," in Internet Computing, IEEE, vol. 12, No. 5, pp. 24-31, Sep.-Oct. 2008.
Mehmet Altinel, Paul Brown, Susan Cline, Rajesh Kartha, Eric Louie, Volker Marki, Louis Mau, Yip-hing Ng, David Simmen, Ashutosh Singh, "Damia—A Data Mashup Fabric for Intranet Applications", VLDB 2007, Sep. 23-28, 2007, ACM, p. 1370-1373.
Maximilien, E.M.; Ranabahu, A.; Gomadam, K., "An Online Platform for Web APIs and Service Mashups," in Internet Computing, IEEE, vol. 12, No. 5, pp. 32-43, Sep.-Oct. 2008.
Braga, D.; Geri, S.; Daniel, F.; Martinenghi, D., "Mashing Up Search Services," Internet Computing, IEEE, vol. 12, No. 5, pp. 16, 23, Sep.-Oct. 2008.
Office Communication for U.S. Appl. No. 14/633,003 dated Jun. 18, 2015 (14 pages).
Office Communication for U.S. Appl. No. 14/633,003 dated Oct. 16, 2015 (9 pages).
International Search Report and Written Opinion for Application No. PCTUS2016/015424 dated Apr. 29, 2016, 13 pages.
Braga et al., "Mashing Up Search Services," IEEE Internet Computing, 2008 IEEE, vol. 12, issue 5, 8 pages.

* cited by examiner

```
// Channel Definition
var channel = {
    "lists" : [
        {"object-list" : {
            "id" : "1",
            "sequence" : "6",
            "depends-on" : true,
            "metadata" : "http://.../object_list/",
            "endpoint" : "http://.../object_list/",
            "auth" : {
                "scheme" : "oauth",
                "version" : "2",
                "endpoint" : "http://server.oauth/authorize"
            }
        }},
        {"object-info" : {
            "id" : "2",
            "depends-on" : true,
            "metadata" : "http://.../(object)/",
            "endpoint" : "http://.../(object)/",
            "sequence" : "2"
        }},
```

| Name | Type | Description |
|---|---|---|
| Query | String | HTTP search query |
| Source | String | Source category for search |

804

| Name | Type | Description |
|---|---|---|
| ID | Int | Identifier for result set |
| Title | String | Title of HTML Page |
| Description | String | Text describing result |
| URL | String | Location of HTML page |
| Source | String | The category of the result |

INTEGRATION OF CLOUD-BASED SERVICES TO CREATE CUSTOM BUSINESS PROCESSES

CROSS-REFERENCE TO RELATED APPLICATIONS

This Utility Patent Application is a Continuation of U.S. patent application Ser. No. 14/633,003 filed on Feb. 26, 2015, now U.S. Pat. No. 9,203,707 issued on Dec. 1, 2015, entitled "INTEGRATION OF CLOUD-BASED SERVICES TO CREATE CUSTOM BUSINESS PROCESSES," the benefit of which is claimed under 35 U.S.C. § 120, and which is further incorporated by reference in its entirety.

TECHNICAL FIELD

This invention relates generally to integrating business processes and more particularly, to integrating cloud-based services to create custom business processes

BACKGROUND

Organizations are relying more and more on disparate processes that may be provided by an increasing number of internal or external service providers. Various service providers may provide services for communication, event monitoring, contact management, sales process management, or the like. Many of these services may be accessible over a network and/or hosted in a cloud computing environment. Also, members of an organization may access services from remote locations. Further, the ubiquity of the Internet and cloud-based environments has given rise to many services and/or applications that may be easily employed by an organization. In some cases, organizations may desire to create business processes based on two or more disparate services. Unfortunately, in some cases, differences between the interfaces and schemas of the available services may discourage organizations from taking advantage of generating process that integrate separate services. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein:

FIG. 7 illustrates a portion of a channel definition that is in accordance with at least one of the various embodiments;

DESCRIPTION OF VARIOUS EMBODIMENTS

Figure 1:
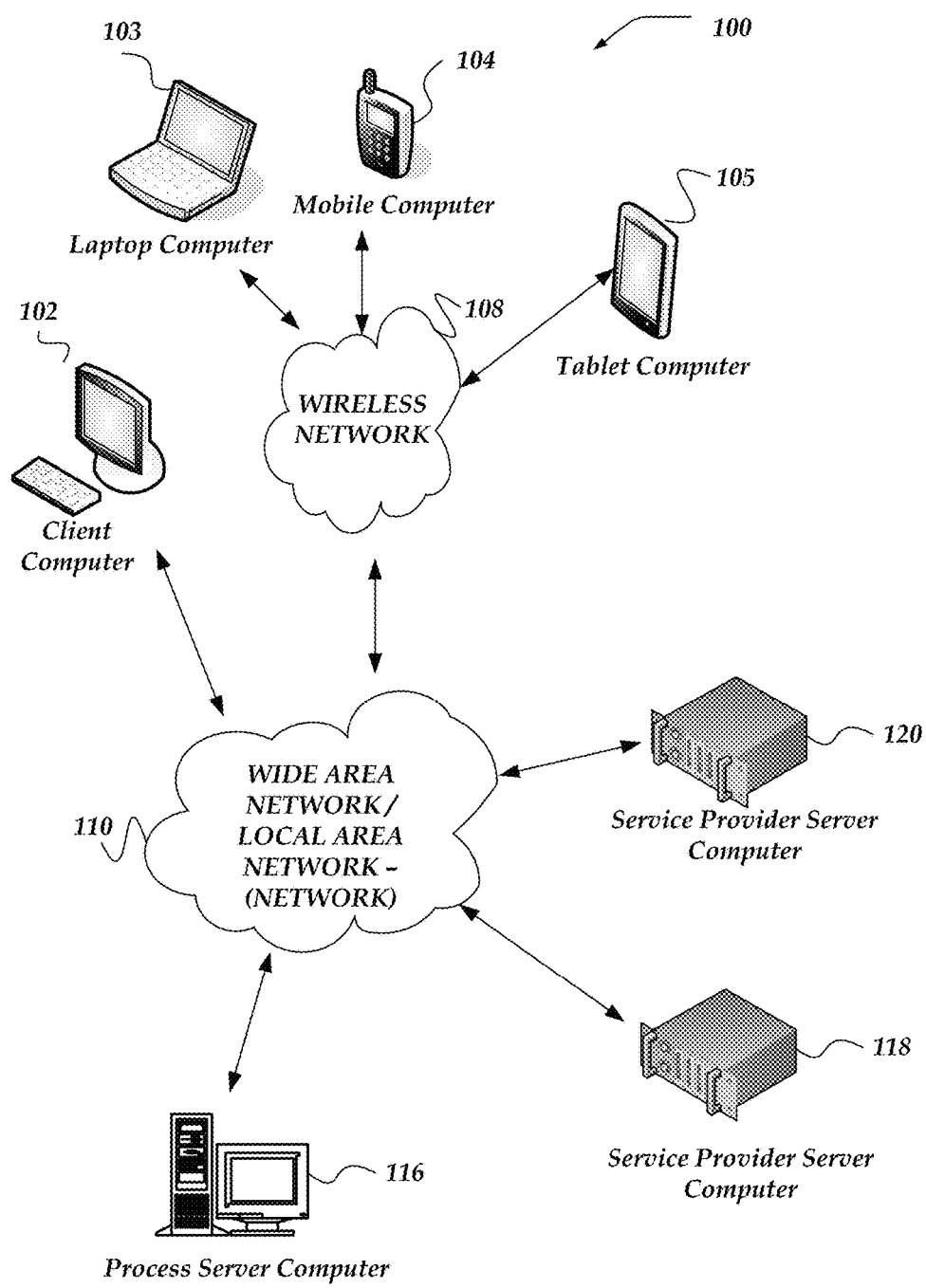
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the terms "service," and "service provider," refer to a computer provided service that may be accessed by another computer and/or service. A service provider may be an internal or external entity that provides one or more services. Services may be software-as-a-service (SaaS) systems, application service provides (ASP), platforms-as-a-service (PaaS), or the like, or combination thereof. Services may be hosted on internal or external networks, including public, private, or hybrid cloud based environments. Example services may include, email, message broadcasting, social networks, system logs, customer relationship management (CRM) applications, search engines, software source control systems, customer support systems, defect/bug tracking systems, or the like.

As used herein the terms "process flow," and "flow" refer generally to a multiple step business process that may be comprised of one or more selected services. One or more events from the selected services may enter the process flow. The events may then be processed according to the design of the process flow.

As used herein the terms "service channel," and "channel" refer to each service included in a process flow. Each service may be represented by a service channel. Service channels represent one or more particular interfaces to a service. In some cases, a service may operate in different modes and/or offer different interfaces for performing different actions, accordingly, each mode and/or interface may be represented as a separate service channel. Each service channel may have a specialized collection of configuration information that describes the correspondent service interface.

As used herein the terms "service channel card," and "card" refer to a user-interface element that may be employed during the display and/or design of process flows. Generally, a service channel card corresponds to a service channel that is included in the process flow. In at least one of the various embodiments, service channel card are user-interfaces employed to access the configuration fields, output flow fields, input flow fields, or the like, of service channels.

As used herein the term "channel configuration value," and "configuration field" refer to fields for holding configuration information for a particular service channel. In some cases, configuration information may include information for authorizing the process flow to access a service. In other cases, configuration information may include hints, filters, rules, or the like, for determining relevant events for a particular service channel. In some embodiments, configuration fields may be displayed on the "back" of a service channel card.

As used herein the term "channel flow field," and "flow field" refer to fields that represent the inputs and/or outputs of a service channel. The availability of a given field, its name, type, purpose, and so on, depend on the particular service channel. In some embodiments, some flow fields may be arranged to be unidirectional while other flow fields may be multi-directional. In at least one of the various embodiments, flow fields arranged to receive information may be described as input flow fields. Likewise, flow fields arranged to provide information from a service channel may be described as output flow fields.

As used herein the term "channel definition" refers to configuration that may describe how to interface with a service channel. In at least one of the various embodiments, each individual service channel may have a corresponding channel definition. In at least one of the various embodiments, the channel definition (described in more detail below) may include configuration information used during process flow design and operation. Such information may include, meta-data sources, authorization method information, field layout information, or the like.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing online computer services to integrate of cloud-based services to create custom business processes. In at least one of the various embodiments, a process flow may be generated to perform a custom business process. The process flow may include multiple service channels that are coupled together by one or more input flow fields or one or more output flow fields to create a custom business process.

In at least one of the various embodiments, if event information may be provided to the process flow it may perform further actions in response to the event information. In at least one of the various embodiments, one or more service channels may be determined or based on the event information and configuration information that may be associated with the service channels. In at least one of the various embodiments, the configuration information may include information that indicates a kind of event information a service channels may accept. In at least one of the various embodiments, the event information may be provided to one or more input flow fields the one or more service channels enabled to accept the event information. In at least one of the various embodiments, result information may be generated by the one or more service channels based on the event information, and the configuration information. Accordingly, the result information may be provided to one or more output flow fields and/or one or more display fields of the one or more service channels. Also, in at least one of the various embodiments, the result information generated by service channel may be forward to one or more input flow fields of a next service channel.

In at least one of the various embodiments, when a remainder of the plurality of service channels are linked to one or more output flow fields of the determined service channels, iteratively determining one or more next service channels from the remainder of the plurality of service channels based on the result information, wherein previously generated result information is provided to the one or more input flow fields of the one or more next service channels, and wherein next result information is generated using the one or more next service channels based on the previously provided result information.

In at least one of the various embodiments, generating a temporary process flow that includes another service channel. Using the temporary process flow to communicate an authentication request to a service provider that corresponds to the other service channel. And, in at least one of the various embodiments, if the service provider authenticates the service channel, storing credentials corresponding to a user and the service provider in a hardware data store.

In at least one of the various embodiments, communicating some or all of the event information to a remote service provider computer that is associated with the service channel. And, in at least one of the various embodiments, employing a response that may be provided by the remote service provider computer in the generation of the result information.

In at least one of the various embodiments, a request for meta-data maybe communicated to a remote service provider computer. In at least one of the various embodiments, one or more configuration fields may be generated for the service channels based on the meta-data provided by the remote service provider computer enabling a user to configure the service channels. In some embodiments, access to the meta-data provided by the remote service provider computer may be restricted based on the role of the user.

In at least one of the various embodiments, the service channels may be arranged to extract one or more fields from the event information rather than employing all of the event information. In at least one of the various embodiments, determining the portion of the event information to extract may be based on configuration information for the service channels.

In at least one of the various embodiments, service channel card user-interfaces that each display configuration fields corresponding to particular service channels may be generated and displayed to a user. In at least one of the various embodiments, the configuration fields may be displayed on the back face of the service channel card user-interfaces. Accordingly, in at least one of the various embodiments, if sufficient configuration information is entered into the configuration fields of the service channel card user-interfaces, the front face of the service channel card user-interfaces may be displayed to expose the flow fields of the service channels to the user.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Process Server Computer 116, one or more services provided by servers, such as, Service Provider Server Computer 118, Service Provider Server Computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, process server computer 116, service provider server computer 118 and service provider server computer 120, or other computers.

Client computers 102-105 may further be configured to include a client application that enables an end-user to log into an end-user account that may be managed by another computer, such as process server computer 116, service provider server computer 118, service provider server computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, or the like, to process server computer 116. Also, client computers may be arranged to enable users to display reports, interactive user-interfaces, and/or results provided by process server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, process server computer 116, service provider server computer 118, service provider server computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of process server computer 116 is described in more detail below in conjunction with FIG. 3. Briefly, however, process server computer 116 includes virtually any network computer capable of service integration in network environment.

Although FIG. 1 illustrates process server computer 116, service provider server computer 118, and service provider server computer 120, each as a single computer, the innovations and/or embodiments are not so limited. For example, one or more functions of process server computer 116, and service provider server computer 118, and service provider server computer 120, or the like, may be distributed across one or more distinct network computers. Moreover, process server computer 116, and service provider server computer 118, and service provider server computer 120, are not limited to a particular configuration such as the one shown in FIG. 1. Thus, in one embodiment, process server computer 116, and service provider server computer 118, and service provider server computer 120 may be implemented using a plurality of network computers. In other embodiments, server computers may be implemented using a plurality of network computers in a cluster architecture, a peer-to-peer architecture, or the like. Further, in at least one of the various embodiments, process server computer 116, and service provider server computer 118, and service provider server computer 120 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
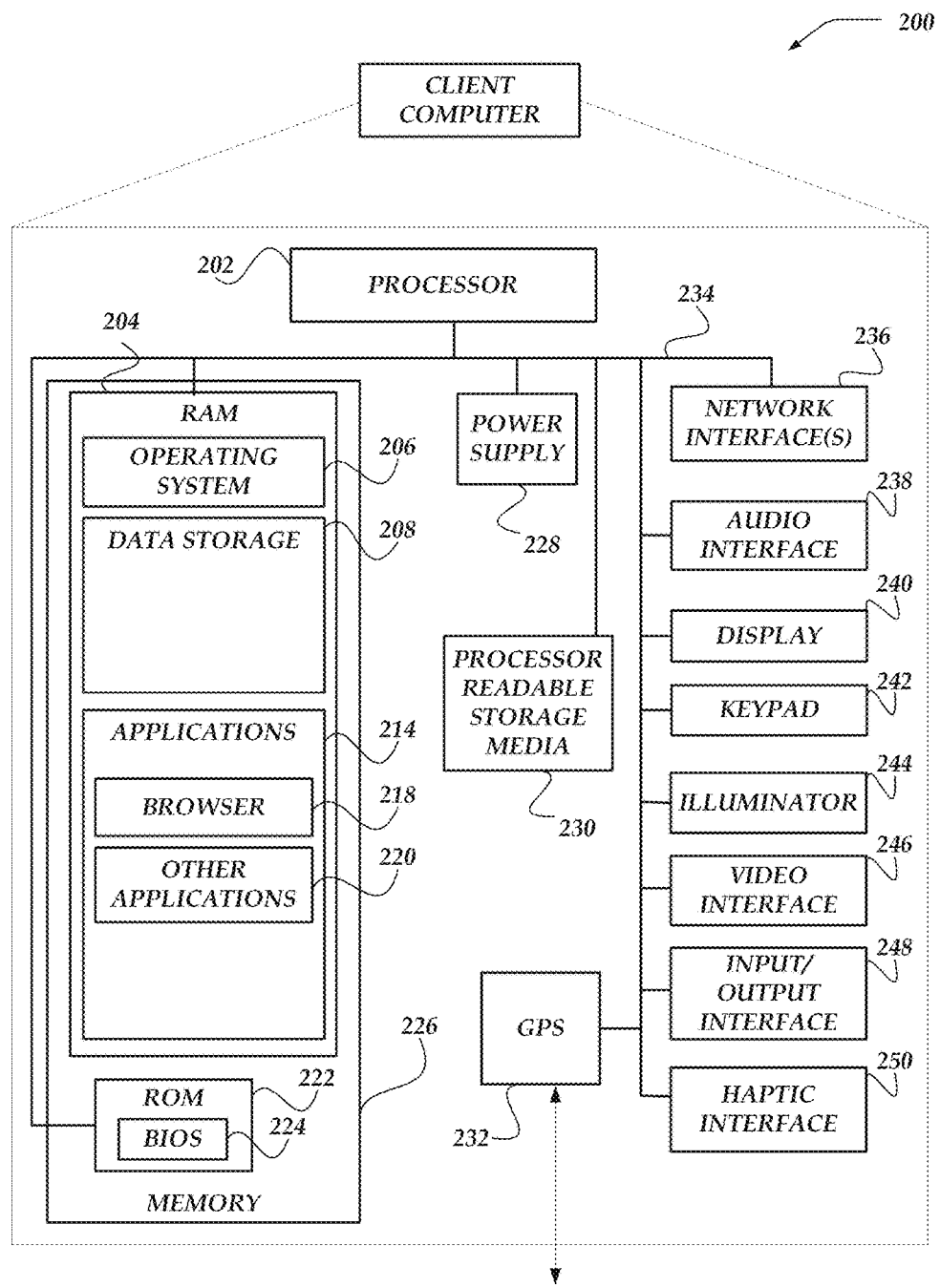
FIG. 2 shows a schematic embodiment of a client computer.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor device, such as processor 202 in communication with a mass memory 226 via a bus 234. In some embodiments, processor 202 may include one or more central processing units (CPU) and/or one or more processing cores. Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another computer. Applications 214 may include, for example, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, HTML5, XML, and the like, to display and send a message. However, any of a variety of other web-based programming languages may be employed. In one embodiment, browser 218 may enable a user of client computer 200 to communicate with another network computer, such as process server computer 116, and service provider server computer 118, and service provider server computer 120, or the like, as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
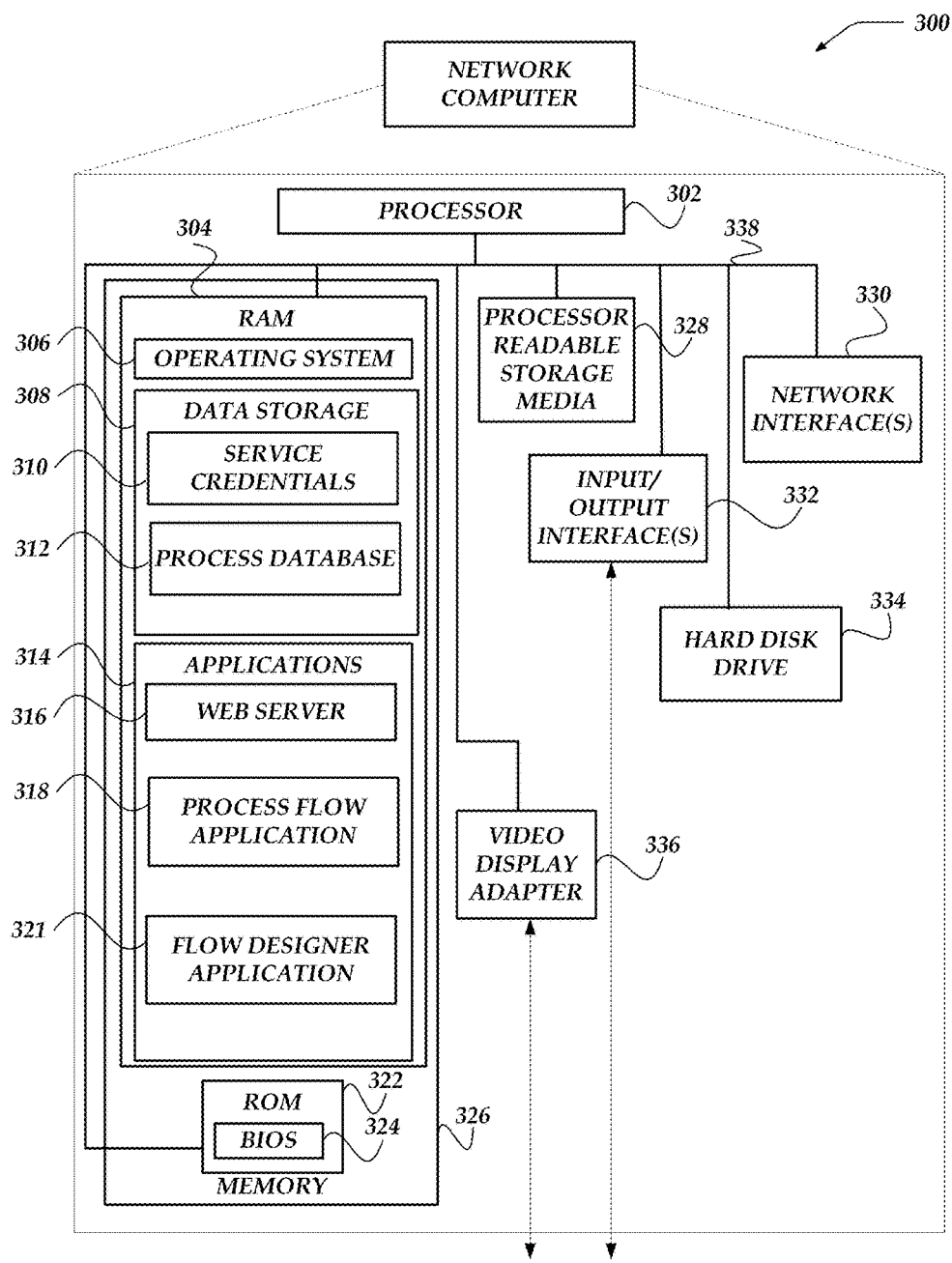
FIG. 3 illustrates a schematic embodiment of a network computer.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example process server computer 116, and/or other network computers, such as, service provider server computer 118 and service provider server computer 120, or the like.

Network computer 300 includes one or more processor devices, such as, processor 302. Also, network computer 300 includes processor readable storage media 328, network interface unit 330, an input/output interface 332, hard disk drive 334, video display adapter 336, and memory 326, all in communication with each other via bus 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, solid state storage devices, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor device, such as processor 302 to execute and perform actions. In one embodiment, at least some of data store 308 might also be stored on another component of network computer 300, including, but not limited to processor-readable storage media 328, hard disk drive 334, or the like.

Data storage 308 may include service credentials 310. In at least one of the various embodiments, service credentials 310 may include information for various accessing one or more service providers, or the like. Also, in at least one of the various embodiments, data storage 308 may include process database 312 for storing one or more full or partial business processes that integrate one or more services.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user-interface programs, IPSec applications, encryption programs, security programs, SMS message servers, IM message servers, email servers, account managers, and so forth. Applications 314 may also include, web server 316, process flow application 318, flow designer application 321, or the like.

Web server 316 may represent any of a variety of information and services that are configured to provide content, including messages, over a network to another computer. Thus, website server 316 can include, for example, a web server, a File Transfer Protocol (FTP) server, a database server, a content server, email server, or the like. Website server 316 may provide the content including messages over the network using any of a variety of formats including, but not limited to WAP, HDML, WML, SGML, HTML5, XML, Compact HTML (cHTML), Extensible HTML (xHTML), or the like.

Illustrative Logical Architecture

Figure 4:
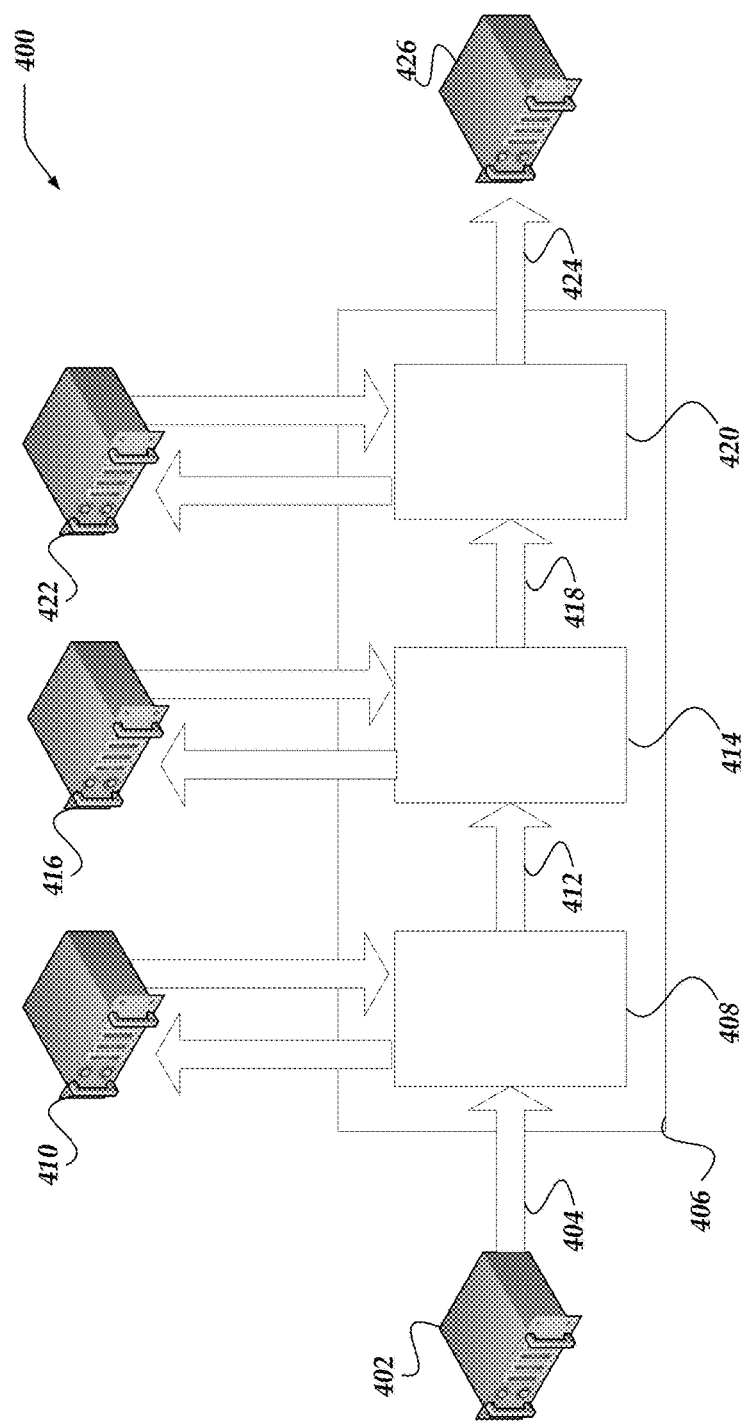
FIG. 4 shows a logical schematic of a portion of a service integration system in accordance with at least one of the various embodiments.

FIG. 4 shows a logical schematic of a portion of service integration system 400 in accordance with at least one of the various embodiments. Briefly, in at least one of the various embodiments, system 400 may illustrate a service flow comprised of three different services.

In at least one of the various embodiments, service provider 402 may provide information such as various kinds of events over a communication path, such as communication path 404. The communication from service provider may be provided to process flow application 406. Accordingly, in at least one of the various embodiments, process flow application 406 may provide the information from service provider 402 to a flow representing a business process. In at least one of the various embodiments, process flows may be comprised of one or more service channels, such as, service channel 408, service channel 412, and service channel 422. In some embodiments, flows may be arranged to have a defined sequence such that the service channels may be accessed in a particular order (if at all). Accordingly, in this example, service 408 may receive the information from service provider 402. In other embodiments, one or more service channels may be arranged to receive information concurrently (e.g., in parallel).

In at least one of the various embodiments, service channel 408 may be arranged to generate result information based on some or all of the information from service provider 402. In some embodiments, the information may be provided to another service provider such as service provider 410. Accordingly, in at least one of the various embodiments, service provider 410 may generate the result information and provide it back to the service channel. Also, service provider 410 may generate information that may be further processed by service channel 408 before it may be presented as result information. For example, a service channel may receive an event and provide a portion of the event to a service provider for processing and then provide the processed event information to another service channel.

In at least one of the various embodiments, if process flow 406 includes more than one service channel, the next service channel in the flow may be provided the results from one or more previous service channels. In this example, service channel 408 communicates some or all its result information over communication path 412 to service channel 414. Likewise, in some embodiments, service channel 414 may be arranged to provide some or all of the information communicated from service channel 408 to service provider 416. The substantially same actions described may be performed for each service channel in the flow. Thus, in this example, information from service channel 414 may be provided over communication path 418 to service channel 420 and then to service provider 422, and so on.

In at least one of the various embodiments, each process flow may have an endpoint service provider that is provided information from one or more of the service channels in the flow. In this example, service provider 426 may be considered the endpoint service provider. Accordingly, result information from service channel 420 may be provided to service provider 426 over communication path 424.

Further, in at least one of the various embodiments, although process flow application 406 is illustrated as a sequential and/or synchronous flow process, starting at service channel 408 and ending and service channel 420, other flow process applications may be arranged to include one or more asynchronous events. For example, in at least one of the various embodiments, a service channel may asynchronously communicate to a service provider. Accordingly, in this example, if the service provider later communicates a response, it may be provided to the service channel. Also, in at least one of the various embodiments, service channels that may be waiting for a response from a service provider may be marked and/or tagged as being in wait state.

In at least one of the various embodiments, flow process applications may be arranged to include one or more service channels that may operate in parallel as well as asynchronously. Also, in at least one of the various embodiments, a flow process application may be arranged such one or more service channels may be block to progress of the process until they have fully processed the event. For example, a service channel may be configured to block the operation of a flow process application while it is waiting for a service provided to respond to communication.

Figure 5:
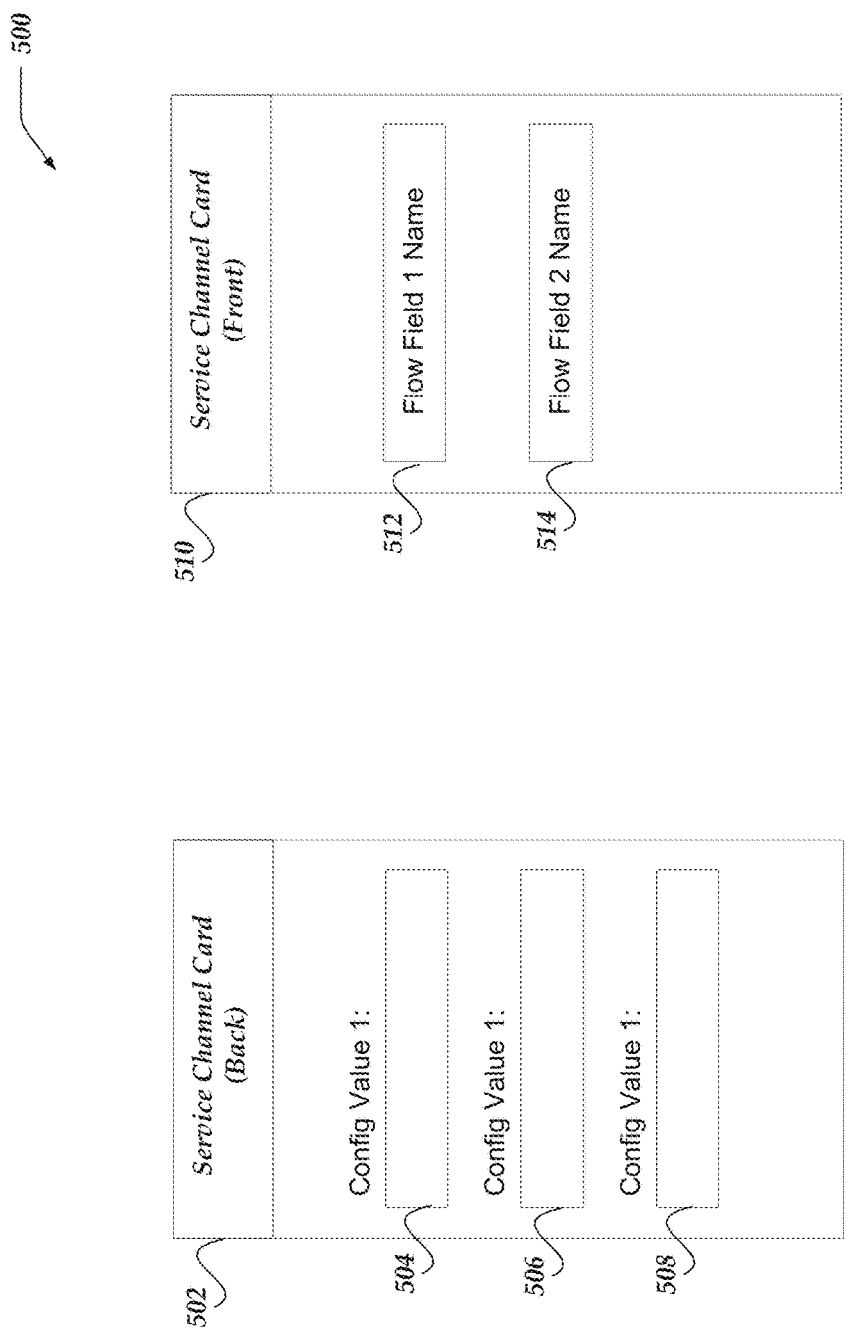
FIG. 5 illustrates a logical representation of a service channel as employed/represented by a flow designer application in accordance with at least one of the various embodiments.

FIG. 5 illustrates a logical representation of service channel 500 as employed and/or represented by a flow designer application, such as, flow designer application 321. In at least one of the various embodiments, process flows may comprise one or more service channels. In at least one of the various embodiments, service channel 500 may represent a connection to a service provider.

In at least one of the various embodiments, a flow designer application may be arranged to enable users to implement process flows by adding, configuring, and/or arranging service channels using service channel cards. In at least one of the various embodiments, service channel cards may be data structures and/or user-interfaces that enable a user to configure service channels and add them to a process flow.

For example, card 502 represents the back-side of a service channel card. In at least one of the various embodiments, the back-side of a service channel card may be arranged to collect configuration information for an instance of the particular service channel. Accordingly, in at least one of the various embodiments, there may be fields displayed in a user-interface for collecting configuration information. In this example, configuration field 504, configuration field 506, and configuration field 508 are illustrative of configuration fields for a particular service channel.

In at least one of the various embodiments, the number of configuration fields and their purpose may vary depending on the service provider that may be associated with the service channel. In some embodiments, configuration fields may be text fields for entering information. In at least one the various embodiments, configuration fields may be lists that include items that may be selected by a user.

In at least one of the various embodiments, the configuration fields for a particular service channel may depend on the requirements and/or features of the service, service channel, and/or the service provider. In at least one of the various embodiments, a flow designer application may be arranged to query the service provider to determine the configuration information for generating a service channel instance. Also, in at least one of the various embodiments, a service channel definition may include information for determining the configuration information and/or configuration fields that may be displayed in the service channel card.

In at least one of the various embodiments, if the service channel is configured, the flow designer application may be arranged to display the flow-side of the service channel card (e.g., the front). The flow-side of the service channel card displays fields representing information that may be provided/acquired from the service that is associated with the service channel card—the inputs and outputs.

For example, card 510 represents a flow-side of the service channel card. In at least one of the various embodiments, the flow-side (e.g., front-side) of a service channel card may be arranged to show input/output interfaces for the service channel. This information may be arranged into one or more flow fields.

Accordingly, in at least one of the various embodiments, there may flow fields displayed in a user-interface for showing the information that may be available. In this example, flow field 512, and flow field 514 are illustrative of flow fields for this particular service channel. Note, the number of configuration fields may be different than the number of flow fields. In at least one of the various embodiments, flow fields may be displayed as a label of the name of the field rather the contents or values of the field. Also, in at least one of the various embodiments, one or more flow fields for a service channels may be marked as required, indicating the contents (if any) of the flow fields must be displayed on service channel card.

Further, in at least one of the various embodiments, a user-interface may be arranged use different user-interface idioms and/or controls that enable access and display of the configuration fields and the flow fields. Accordingly, in at least one of the various embodiments, the different types of fields may be accessed using a tab control, such that selecting one tab may cause the configuration fields to be displayed and selecting another tab may cause that flow fields to be displayed. Also, one of ordinary skill in the art will appreciate the other user-interfaces may be employed to enable access and display of the configuration fields and the flow fields.

Figure 6:
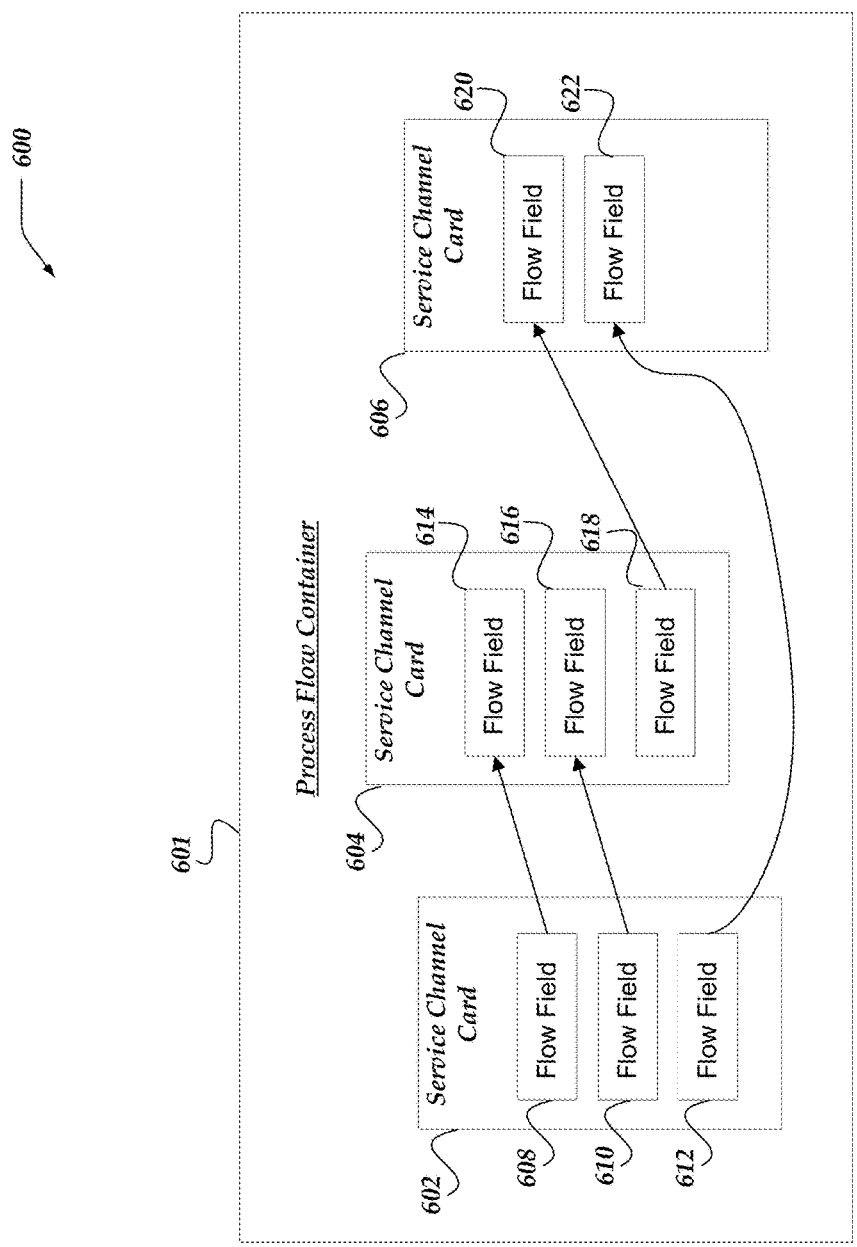
FIG. 6 shows a logical representation of a portion of a process flow as designed using a flow designer application in accordance with at least one of the various embodiments.

FIG. 6 shows a logical representation of a portion of process flow 600 as designed using a flow designer application in accordance with at least one of the various embodiments. In at least one of the various embodiments, if service channel cards have been added to a process flow and configured, the flow fields from one service channel card may be mapped to flow fields for one or more other service channel cards. In at least one of the various embodiments, card 602, card 604 and card 606 represent front-sides of three service channel cards that have been added to process flow container 601 and that are part of process flow 600.

In at least one of the various embodiments, a flow designer application may be arranged to enable user to map the flow fields from one service channel card to another. In at least one of the various embodiments, each service channel card may display one or more flow fields. Flow fields may be labeled with a name relevant to service channel they are associated with. In some embodiments, the label of the flow field may be defined by a user as part of configuring the service channel card. In FIG. 6, for brevity and clarity the flow fields are illustrated using the label "Flow Field". However, in at least one of the various embodiments, in practice flow fields may have labels such as, name, id, URL, subject, contents, description, suite number, address, and so on. In at least one of the various embodiments, the label may correspond with fields/properties of the underlying service channel interface. As discussed above, the flow designer application may be arranged to query meta-data information from the service providers to determine which flow fields are available for configuration and/or mapping.

Further, in at least one of the various embodiments, flow fields may represent outputs (sources) or inputs (sinks) of the service depending on the underlying service and its interface. Also, in at least one of the various embodiments, a service provider may offer more than one service channel that may have different interfaces, such as, as service channel interface for receiving/retrieving events/information and a different interface for sending/generating events/information. In some embodiments, a service channel may include input and output flow fields in the same interface.

In the example shown in in FIG. 6, card 602 includes flow field 608, flow field 610, and flow field 612. Card 604, includes flow field 614, flow field 616, and flow field 618. And, card 606 includes flow field 620 and flow field 622. Continuing with this example, process 600 includes flow fields mapped from card 602 to flow fields in card 604 and card 606. And, flow fields from card 604 mapped to card 606. As illustrated by this example, flow fields may be selectively mapped. And, flow fields may "skip" a service channel card as shown here. (Flow field 612 is mapped to flow field 622 skipping service channel card 604).

In at least one of the various embodiments, flow fields from one service channel card may be mapped to two or more service channel cards. Also, there is no general requirement to map each flow field. In at least one of the various embodiments, the flow fields may be selected for mapping based on the design intentions of the user.

FIG. 7 illustrates a portion of channel definition 700 that is in accordance with at least one of the various embodiments. In at least one of the various embodiments, as introduced above, various rules and/or properties of service channels may be defined using a service channel definition.

In at least one of the various embodiments, service channel definitions may be defined using various well-known formats for describing configuration information. Accordingly, channel definitions may be defined using, JSON, XML, HTML, scripts (e.g., M4, Perl, Ruby, Python, or the like), schema files, or the like, or combination thereof.

In at least one of the various embodiments, channel definitions may be arranged to include instructions for retrieving the meta-data associated with service and/or service provider. In at least one of the various embodiments, the endpoints information may be specific to a particular service.

Also, in at least one of the various embodiments, since many services require authorization and/or authentication before allowing access, the channel definition may include information describing how to authenticate with the service.

Additionally, in at least one of the various embodiments, channel definitions may include information that informs the flow designer application how to layout the service channel card for display. For example, as shown in definition 700, a channel definition may include definitions for one or more field flows. In some embodiments, a sequence property may be included in the channel definition to suggest a sort order for display in a user-interface. Also, in at least one of the various embodiments, one or more flow fields for a service channels may be marked to be required, indicating the contents (if any) of the flow fields must be displayed on service channel card.

Further, the channel definition may include information for describing configuration information for the channel as well as flow fields. In some embodiments, configuration information may be marked to be required or optional.

In this example, a portion of a channel definition, channel definition 700 is implemented in a JSON format. Definition 700 includes an array of list definitions and an example object-info definition. Embedded in each is an example of an authorization section ("auth") which may include information for authenticating with the underlying service.

In at least one of the various embodiments, if the service provider supports and/or provides meta-data information the channel definition may be defined to retrieve meta-data for determining the available features of the service channel. Accordingly, when the service channel card is added to a flow, the flow designer application may retrieve the meta-data information from the service provider and use it to determine the configuration fields and/or flow fields that may be available for the service channel card.

In at least one of the various embodiments, channel definitions may be defined to support one or more interfaces provided by a service provider. Channel definitions may correspond to particular services. Accordingly, in at least one of the various embodiments, channel definitions may be specialized for one particular services. For example, in at least one of the various embodiments, if a user selects a service for adding to a process, the flow designer application may employ the channel definition that is associated with the selected service.

Figure 8:
FIG. 8 illustrates a portion of a channel interface for a service in accordance with at least one of the various embodiments.

FIG. 8 illustrates a portion of service channel interface 800 for a service in accordance with at least one of the various embodiments. In at least one of the various embodiments, service channel interface 800 may be arranged to conform to one or more interfaces that may be supported by a service provider. Interface 800 is an example of a simple interface for a search engine service provider. In at least one of the various embodiments, some services may have input and output interfaces. In this example, table 802 describes an input interface of a search engine provider and table 804 describes an output interface for the same search engine provider. In at least one of the various embodiments, each interface may be considered a separate service channel.

In at least one of the various embodiments, service providers may define meta-data interfaces that provide additional and/or detailed interfaces to the under lying fields and properties for a service. For example, in at least one of the various embodiments, a channel definition may define an endpoint (e.g. URL, IP address, port number, or the like, or combination thereof) that the flow designer application may employ for obtaining the current interface information for the service channel. For example, a flow designer application may employ a meta-data endpoint for a search engine service to determine the characteristics (e.g., field information) of the service and/or service channel.

Accordingly, in at least one of the various embodiments, the flow designer application may enable user to generate process flows based on the interface information provided by the service itself rather than each process flow and/or service channel being strictly tied to a particular interface. In at least one of the various embodiments, brittle configuration and design may be avoided since the flow designer application may be arranged to communicate with the service provider to retrieve meta-data for determining the current details of a service channel interface.

In at least one of the various embodiments, service providers may enable their users to generate customized schemas and/or objects. Accordingly, in at least one of the various embodiments, the channel definitions for service channels for such providers may be arranged to query the meta-data that describes the schemas and/or objects that are available and generate service channel card based on the meta-data. Thus, in at least one of the various embodiments, a single channel definition may support individually customized schemas and/or objects from the same service provider. Accordingly, user customization of the service provider data will not break the channel definition.

Generalized Operation

FIGS. 9-13 represent the generalized operation for integration of cloud-based services to create custom business processes in accordance with at least one of the various embodiments. In at least one of the various embodiments, processes 900, 1000, 1100, 1200, and 1300 described in conjunction with FIGS. 9-13 may be implemented by and/or executed on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 9-12 may be operative for integration of cloud-based services to create custom business processes in accordance with at least one of the various embodiments and/or architectures such as those described in conjunction with FIGS. 4-8.

Figure 9:
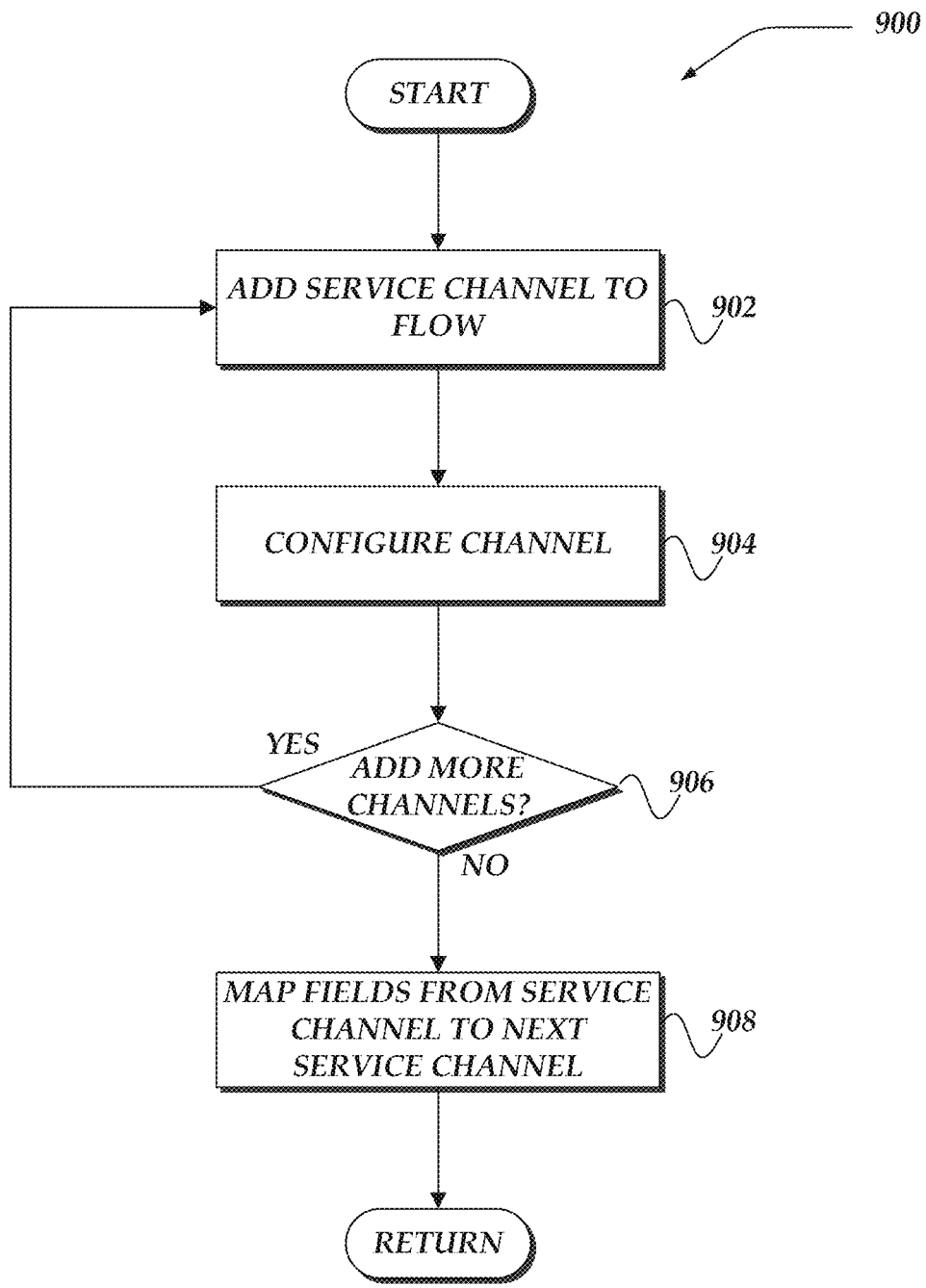
FIG. 9 shows an overview flowchart for a process for designing process flows using a flow designer application in accordance with at least one of the various embodiments.

FIG. 9 shows an overview flowchart for process 900 for designing process flows using a flow designer application in accordance with at least one of the various embodiments. After a start block, at block 902, in at least one of the various embodiments, a service channel may be added to a process flow. In at least one of the various embodiments, a flow designer application may be arranged to enable a user to select service channels to include in a process flow. In at least one of the various embodiments, the flow designer application may include graphical user-interface (GUI) that displays the available service channels. Also, in other embodiments, the flow designer applications may be arranged to employ templates and or configuration information to determine the service channels in a process flow. Accordingly, in at least one of the various embodiments, service channels may be selected interactively using a GUI, by encoding the selection into templates, or configuration information, or the like, or combination thereof.

In at least one of the various embodiments, as discussed above a service channel may correspond to a service that is provided by a service provider. In some cases, service providers may provide more than one service. In these cases, there may be one or more service channels associated with a particular service provider. Further, in at least one of the various embodiments, service channels may be specialized such that they have the capability to forward information, receive information, or both. In at least one of the various embodiments, it may be the interface capabilities of the service provider that determine the capabilities of a service channel.

At block 904, in at least one of the various embodiments, the service channel may be configured. In at least one of the various embodiments, some but not all service channels may require configuration before they may be added to process flow. The particular configuration requirements (e.g., configuration fields) may be determined from the channel definition that corresponds to the service channel.

In at least one of the various embodiments, authorization and/or authentication that enables the service channel to communicate with the service provider may be performed as well. In at least one of the various embodiments, the particular actions to authorize and/or authenticate the service channel with a service provider may be included in the service channel definition.

At decision block 906, in at least one of the various embodiments, if more service channels are to be added, control may loop back to block 902; otherwise, control may flow to block 908. In at least one of the various embodiments, service channels may be added to the process flow when it is initially created. Also, in at least one of the various embodiments, service channels may be added or removed from a process flow at another time.

In at least one of the various embodiments, process flows may often have more than one service channel. Accordingly, in at least one of the various embodiments, an additional service channels may be selected for adding to the process flow.

At block 908, in at least one of the various embodiments, one or more flow fields from the service channels may be mapped to each other flow fields. In at least one of the various embodiments, as discussed above, channel definition information and service meta-data may be employed by the flow designer application to generate one or more flow fields for the service channel. Accordingly, in at least one of the various embodiments, the flow fields from one service channel may be mapped to one or more other service channels. Individual mapping of flow field to flow fields may be subject to constraints that are defined the channel definition information and/or the service meta-data. In at least one of the various embodiments, such constraints, may include preventing an output flow field in a service channel from being mapped to an output flow field in another service channel. In this example, the output flow field should be mapped to an input flow field.

In at least one of the various embodiments, the process flow may be described as comprising one or more service channels that may be linked together in a chain by the mapping of the flow fields. Note, in at least one of the various embodiments, not every flow field must be mapped or otherwise actively used in the process flow. Some flow fields may have dependencies, or some service channels may have particular requirements on the fields that must be met to enable mapping. In at least one of the various embodiments, one or more flow fields may remain unmapped to exclude them from the process flow. Next, control may be returned to a calling process.

Figure 10:
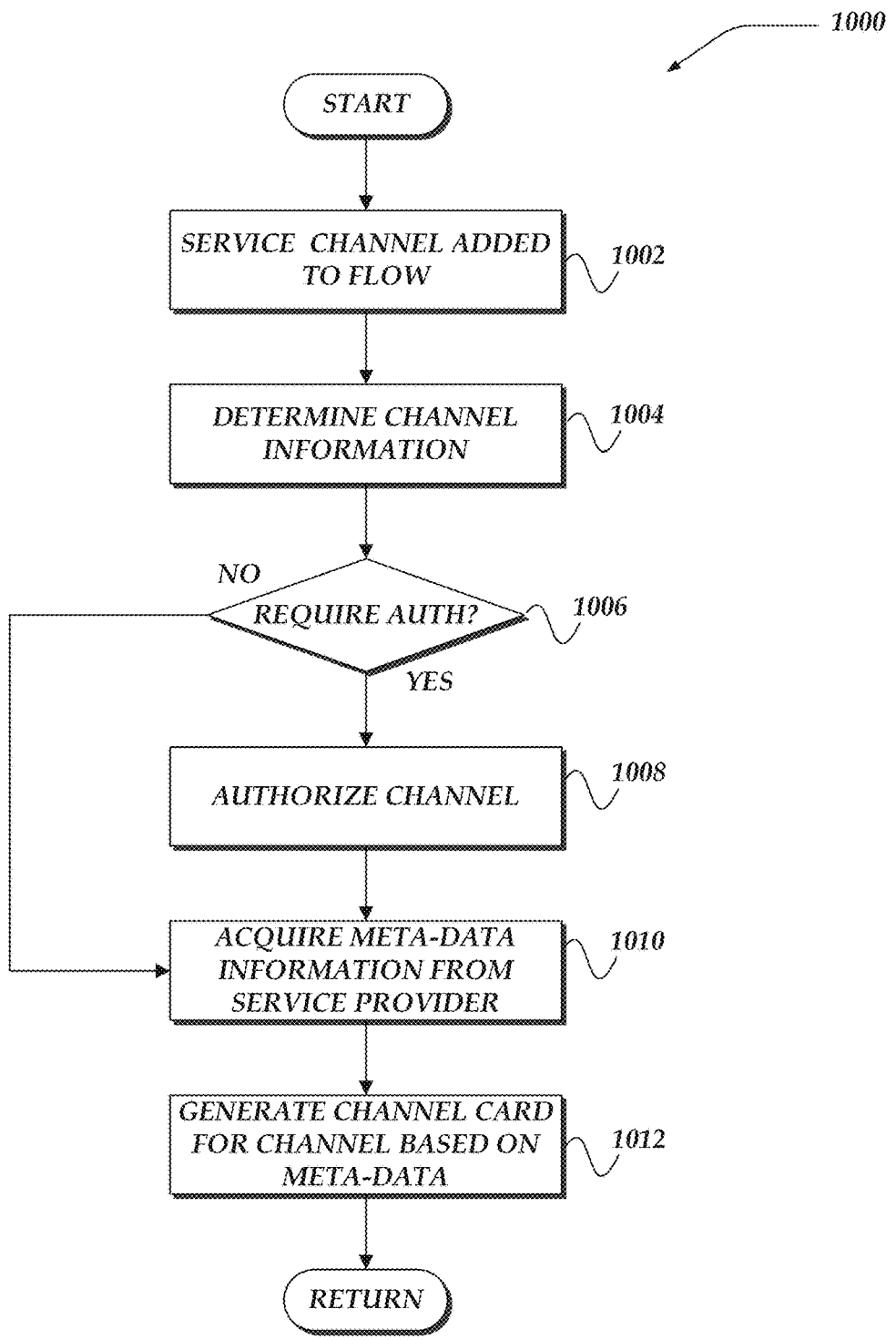
FIG. 10 illustrates a flowchart for process for adding a service channel for a process flow in accordance with at least one of the various embodiments.

FIG. 10 illustrates a flowchart for process 1000 for adding a service channel for a process flow in accordance with at least one of the various embodiments. After a start block, at block 1002, in at least one of the various embodiments, a service channel may be added to a process flow. In at least one of the various embodiments, as described above, a flow designer application may be arranged to enable service channels to be added to a new or existing process flow.

In at least one of the various embodiments, GUI based flow designer applications may represent service channels by using service channel card user-interface element. In some embodiments, a user may select a service channel and drop it into a visual workspace where it may be rendered and displayed in a user-interface as a service channel card.

At block 1004, in at least one of the various embodiments, the service channel definition information for the service channel may be determined. In at least one of the various embodiments, process 1000 may determine the channel definition that corresponds to the service channel. The channel definition may include information, rules, properties, or the like, for instantiating the service channel and its service channel card.

In at least one of the various embodiments, the service channel definition may be associated with a particular service channel based on a lookup table, database, or the like, that maps the service channel to its service channel definition. In at least one of the various embodiments, if the service channel definition is not available, the corresponding service channel will also be unavailable for adding to a process flow.

At decision block 1006, in at least one of the various embodiments, if the service channel requires authorization, control may flow to block 1008; otherwise control may flow to block 1010.

In at least one of the various embodiments, service channels are interfaces for communicating with a service provider. Accordingly, since many service providers may require authentication, the flow designer may be arranged to reference the authorization information that may be included in the service channel definition.

At block 1008, in at least one of the various embodiments, the service channel may be authorized and/or authenticated with the service provider. In at least one of the various embodiments, the flow designer application may refer to the service channel definition for information on how to perform one or more actions to authenticate with the service provider.

In at least one of the various embodiments, the service channel definition may include an authorization and/or authentication section of information. This section may include information such as, the types of authentication supported by the service provider, one or more required fields/properties for authenticating, or the like. For example, in at least one of the various embodiments, a service channel may be required to provide a username and password to access the service provider. In other cases, the service channel may require an application key, merchant key, developer key, or the like, to access to the service. Further, in some embodiments, the service may employ OAUTH authentication, or the like. In such cases, the flow designer application may enable the service provider to present a user-interface to the user for collecting the necessary authentication information.

In at least one of the various embodiments, if authentication is successful, the service provider may provide credential information to the flow designer application. The credential information may be stored and associated with the user, the process flow, the service channel, or the like, or combination thereof. The flow designer application as well as the process flow application may employ the credential information to access the authenticated services.

In at least one of the various embodiments, the flow designer application may automatically generate a temporary or transient process flow to perform the required authentication actions. In some embodiments, an authentication process flow may be instantiated to perform the actions defined in the channel definition. In at least one of the various embodiments, after the authentication process flow has run to completion, the flow designer application may automatically delete/remove to the authentication process flow.

At block 1010, in at least one of the various embodiments, meta-data for the service channel may be obtained from the service provider. In at least one of the various embodiments, the flow designer application may request meta-data from the service provider that may be employed for instantiating the service channel. In at least one of the various embodiments, meta-data may include a list of available interfaces, objects, tables, features, properties, or the like, or combination thereof. In some embodiments, the meta-data may also include dependency rules that define which field/objects (if any) depending others. Further, in at least one of the various embodiments, since the service channel has been authenticated with the service provider, it may provide meta-data may be specialized for the particular role/access level of the user that has been authenticated.

At block 1012, in at least one of the various embodiments, a service channel card may be generated for the service channel based on the service channel definition and the meta-data that may be obtained from the service provider. In at least one of the various embodiments, a service channel card may be displayed. In at least one of the various embodiments, if the service channel requires configuration information, the service channel card may be arranged to display the configuration fields for the service channels. In at least one of the various embodiments, if the service channel is configured or if it does not require configuration, the service channel card may be arranged to show the flow fields that are available. Next, control may be returned to a calling process.

Figure 11:
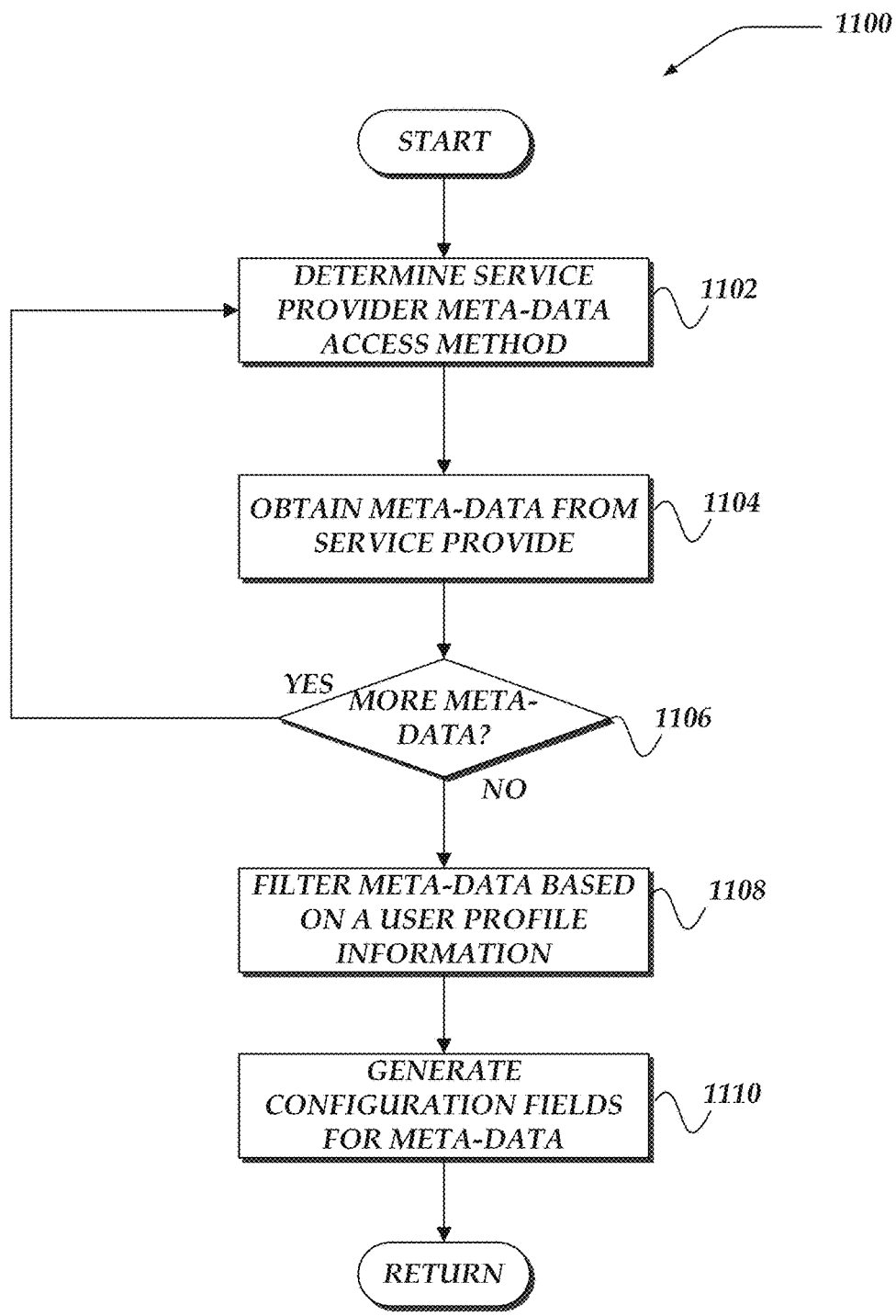
FIG. 11 illustrates a flowchart for a process for obtaining meta-data in accordance with at least one of the various embodiments.

FIG. 11 illustrates a flowchart for process 1100 for acquiring meta-data for a service channel from a service provider, in accordance with at least one of the various embodiments. After a start block, at block 1102, in at least one of the various embodiments, process 1100 may determine one or more methods for accessing service provider meta-data. In at least one of the various embodiments, a service channel definition may include information that describes one or more ways of obtaining service channel definition information from a service provider. For example, in at least one of the various embodiments, a channel definition may include one or more URLs that may be employed for requesting meta-data information from a service provide. In at least one of the various embodiments, meta-data access methods may include one or more operations that may be defined using one or more scripts included in the channel definition.

At block 1104, in at least one of the various embodiments, process 1100 may execute the access methods to obtain meta-data from the service provider. In at least one of the various embodiments, a service provider have multiple access methods and/or access points to obtain meta-data. In some embodiments, service providers may offer multiple services, with one or more of them having separate meta-data access methods. For example, in at least one of the various embodiments, a service provider may use different URLs for accessing meta-data for the different services it may provide. In other cases, requests for accessing meta-data for different services may be distinguished based on parameters, such as, query string parameters, used when making a request to access meta-data.

In at least one of the various embodiments, meta-data provided by a service provider may be in various formats, such as, JSON, XML, text, HTML, or the like, or combination thereof. In at least one of the various embodiments, meta-data may include field definitions, field values, lists of items, table names, column names, or the like, or combination thereof.

At decision block 1106, in at least one of the various embodiments, if there is more meta-data to obtain, control may loop back block 1102; otherwise, control may flow to block 1108. In at least one of the various embodiments, service channel definitions may define multiple meta-data sources for a single service channel. Accordingly, in at least one of the various embodiments, the process may loop back to block 1102 to execute any remaining meta-data access methods that may be described in the channel definition.

At block 1108, in at least one of the various embodiments, the meta-data may be filtered based on a user's profile information. Even though the service provider may filter the meta-data based on the credential information provided during authorization/authentication of the service channel, users of the process flow may have user profiles that may further filter the meta-data.

In at least one of the various embodiments, the process flow and/or the service channel may be configured to restrict access to the fields, values, or other information provided as meta-data by the service provider on a per user and/or per user group basis. For example, a user profile may be arranged for one or more users and/or user groups. Such user profiles may be arranged to define access rules and/or filters to meta-data information. In at least one of the various embodiments, user profiles may be arranged to define filters/rules regarding the access rights to the fields, values, or other information provided as meta-data.

In at least one of the various embodiments, filtering of meta-data may include marking/tagging or more portions of the meta-data with access level indicators, such as, as read-only, writable, immutable, or the like, or combination thereof.

At block 1110, in at least one of the various embodiments, one or more configuration fields may be generated for the displaying and/or configuration the meta-data. In at least one of the various embodiments, each service channel may have one or fields for display and/or interaction with the meta-data. In at least one of the various embodiments, read-only meta-data information may be display in unalterable labels or lists. While, in at least one of the various embodiments, editable meta-data may be displayed in edit fields, pick lists, radio button groups, check lists, sliders, and so on.

In at least one of the various embodiments, there may be system-wide defaults for determining the type of user-interfaces to use for configuration fields. For example, as a default, text edits fields may be generated for individual string valued meta-data fields. However, in at least one of the various embodiments, the service channel definition may be arranged to override defaults (if any) and describe particular layouts and fields for the meta-data for a service channel. For example, in at least one of the various embodiments, even though meta-data information is provided as separate string values, a service channel definition may be configured to arrange the separate string values into a list user-interface rather than separate labels and/or text edit fields.

In at least one of the various embodiments, the meta-data information, configuration fields, and so on may be stored in a data store or data base, such as, process database 312. Next, control may be returned to a calling process.

Figure 12:
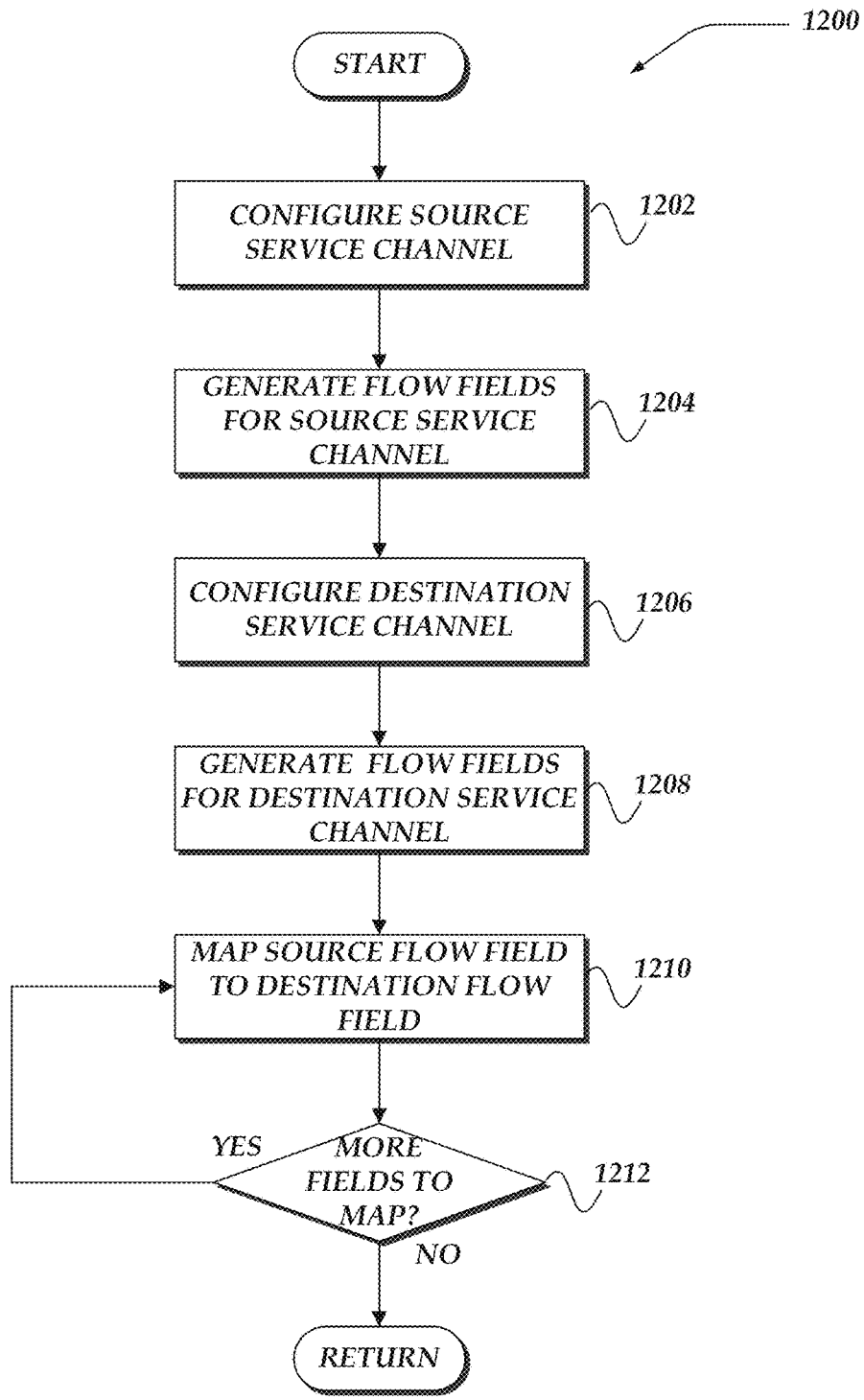
FIG. 12 illustrates a flowchart for a process for mapping fields for a process flow in accordance with at least one of the various embodiments.

FIG. 12 illustrates a flowchart for process 1200 for mapping fields for a process flow in accordance with at least one of the various embodiments. After a start block, at block 1202, in at least one of the various embodiments, a source service channel may be configured. In at least one of the various embodiments, configuration may be based on configuration information/rules that may be included in the channel definition and/or included in the meta-data provided by the service provider.

At block 1204, in at least one of the various embodiments, flow fields for the source service channel may be generated. In at least one of the various embodiments, a source service channel has one or more flow fields that provide information from a service provider.

As discussed above, in at least one of the various embodiments, service channels may be unidirectional or bidirectional with respect to their interaction with the service provider. For example, in some embodiments, a particular service such as a search engine service, may be configured to execute a search query and return the results of the query. Accordingly, for this example, the flow fields available for the search engine service channel may be source flow fields since they only hold results from the service provider (e.g., the query results) rather than receiving input that is sent to the service provider.

Also, in at least one of the various embodiments, if one or more flow fields for a service channels are marked as required, the flow fields must be generated for display on the service channel card. Likewise, in at least one of the various embodiments, one or more flow fields that are marked as hidden may be generated but omitted from display on the service channel card.

At block 1206, in at least one of the various embodiments, a destination service channel may be configured. In at least one of the various embodiments, the destination service channel may be configured as necessary. In at least one of the various embodiments, a destination service channel is channel that the user/designer intends to supply events and/or information from another service channel in the process flow. In at least one of the various embodiments, destination service channels are not necessarily a particular category of service channels—they are simply service channels that have one or more flow fields that may receive input from another service channel.

At block 1208, in at least one of the various embodiments, flow fields for the destination service channel may be determined. In at least one of the various embodiments, the flow designer application may generate the flow fields for the destination service channel. In at least one of the various embodiments, flow fields in a destination service channel may include source flow fields and input flow fields at the same time.

In at least one of the various embodiments, the flow designer application may employ the channel definition and/or the configuration information for the service channel to determine the input flow fields for the destination service channel.

At block 1210, in at least one of the various embodiments, a source flow field from a source service channel may be mapped to a destination flow field of a destination service channel. In at least one of the various embodiments, the flow designer application may be arranged to enable a user to select a source flow field from a source service channel and map it to an input flow field in the destination service channel.

In at least one of the various embodiments, the flow designer application may include a graphical user-interface (GUI) that enables a user to select flow fields for mapping using a mouse, touchscreen, or other pointing device. Also, in at least one of the various embodiments, the flow designer application may be arranged to employ configuration information and/or template information for mapping flow fields. For example, a process template may be predefined to include information defining how one or more particular service channels may be mapped into a process.

At decision block 1212, in at least one of the various embodiments, if there are additional flow fields in the source service channel that require mapping, control may loop to block 1210; otherwise, control may be returned to a calling process.

In at least one of the various embodiments, users are not limited to mapping field flows in a particular sequence. Also, in at least one of the various embodiments, source flow fields may be mapped to more than one input flow field. In at least one of the various embodiments, the mapping process may be interactive in at least the sense that flow fields from the various service channels in the process flow may be mapped and/or unmapped based on the selection of the user—rather than any particular fixed order based on the order the service channel is positioned in the process flow.

Figure 13:
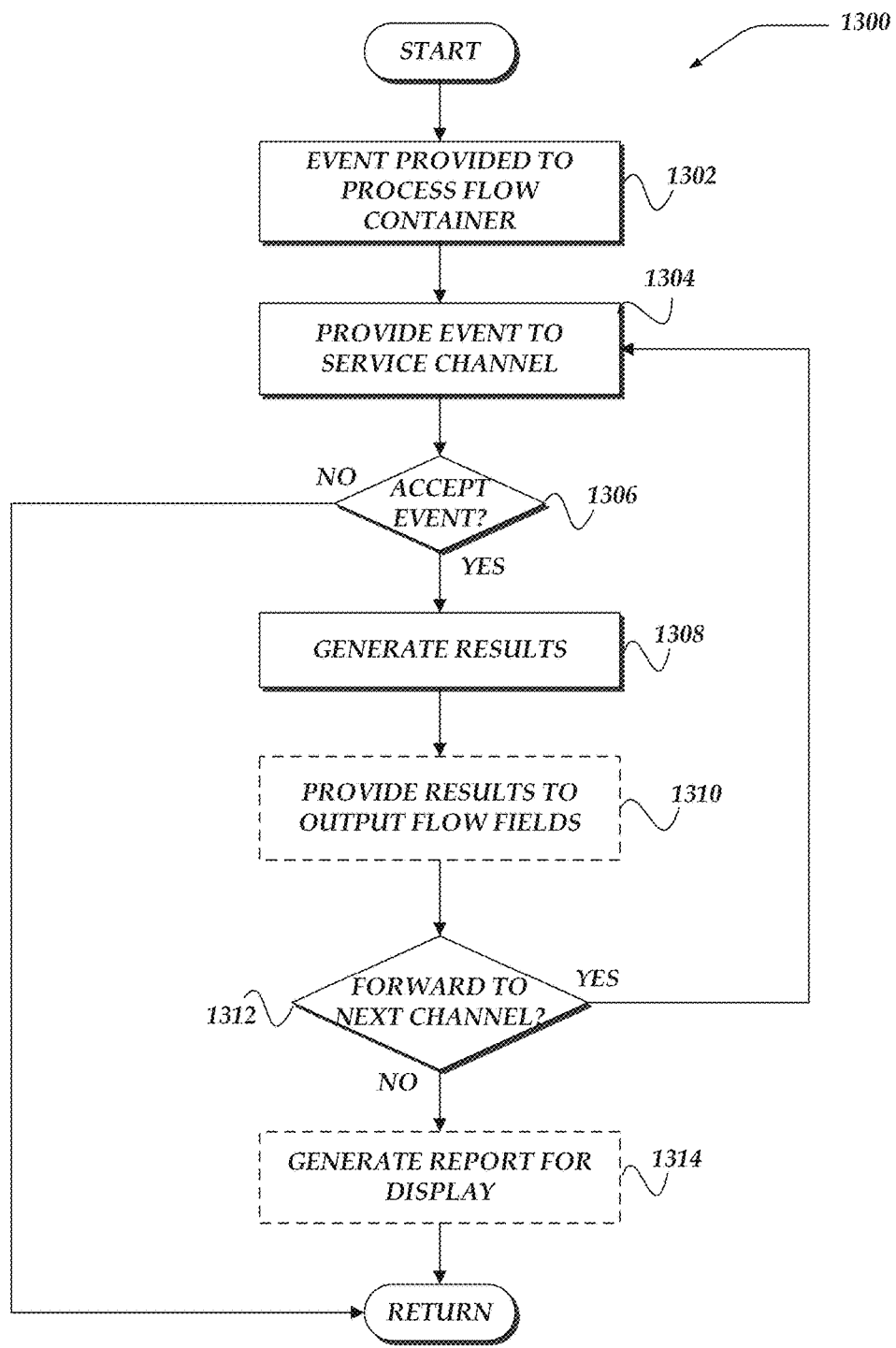
FIG. 13 illustrates a flowchart for a process for processing events using a process flow in accordance with at least one of the various embodiments.

FIG. 13 illustrates a flowchart for process 1300 for executing a process flow in accordance with at least one of the various embodiments. After a start block, at block 1302, in at least one of the various embodiments, one or more kinds of events may be provided to the process flow. In at least one of the various embodiments, if a process flow is generated, configured, and activated, the service channels comprising the process flow may be ready for communicating with their correspondent service providers.

In at least one of the various embodiments, events from a service provider may be pushed or pulled depending on characteristics of the provided interface. In at least one of the various embodiments, the process flow may periodically poll the service provider that is associated with the initial and/or root service channel.

In at least one of the various embodiments, events may be results generated by a service provider in response to query from a service channel. Accordingly, the content and format of the results may be dictated by the service provider and those disclosed interfaces. In at least one of the various embodiments, the service provider may provide information (events) to the process flow according to its own policy. For example, some service providers may generate events every 5 minutes, while others may generate a continuous stream of events. In some embodiments, configuration information provided by a service channel may influence how and/or how often a service provider may communicate information to the process flow.

At block 1304, in at least one of the various embodiments, the one or more events may be provided to a service channel in the process flow. In at least one of the various embodiments, service provider events that may be directed towards a process flow may be directed to a service channel in process flow. In at least one of the various embodiments, the event may be directed to a service channel that corresponds to the service and/or service provider.

In at least one of the various embodiments, a process flow may have a single service channel that acts an entry point to the process flow. In other embodiments, process flows may have one or more service channels may receive events concurrently from one or more service providers.

At decision block 1306, in at least one of the various embodiments, if the service channel accepts the kind of event, control may flow block 1308; otherwise, control may be returned to a calling process. In at least one of the various embodiments, service channels may be configured to accept events that meet one or more criteria. Accordingly, in at least one of the various embodiments, events that fail to meet the criteria may be ignored and/or discarded.

In at least one of the various embodiments, events may be accepted based on various criteria, such as, event size, content, event rate, event source, kind of event, type of event, pattern matches, filters, or the like, or combination thereof. In at least one of the various embodiments, the configuration information for a service channel may include configuration fields for defining one or more of the criteria for accepting an event.

At block 1308, in at least one of the various embodiments, the service channel may generate one or more results based on the one or more events. In at least one of the various embodiments, in response to receiving an event, the service channel may be arranged to produce one or more results based on the received results. In some embodiments, the service channel may pass the event information through without modification. In other embodiments, the service channel may be configured to perform data processing on the event information. For example, the service channel may be arranged to extract one or more fields of information from the event information. In some cases, the extracted fields may be determined based on how the service channel card is configured. In other cases, such configuration information may be included in the channel definition information. In at least one of the various embodiments, the service channel may reformat some or all of the event information. In at least one of the various embodiments, the service channel may be arranged to process and/or modify the event information before it is provided to another service channel. In some embodiments, service channels may be arranged to process and/or modify event information without communicating to a service provider.

In at least one of the various embodiments, the service channel may communicate some or all of the event information to a remote service provider server computer. The service provider server computer may respond with new information based on the event information provided by the service channel. Accordingly, in at least one of the various embodiments, the results generated by the service channel may be generated by the remote service provider server computer.

At block 1310, in at least one of the various embodiments, optionally, some or all of the results may be provided to one or more output flow fields of the service channel. In at least one of the various embodiments, output flow fields may be arranged to display one or more result values on a user-interface service card. In at least one of the various embodiments, result information that is provided to the output flow fields may be provided to one or more input flow fields of one or more other service channels. In at least one of the various embodiments, block may optional because, some service channels may be arranged to perform an action based on the result information (e.g., send an email) rather than providing results to another service channel.

At decision block 1312, in at least one of the various embodiments, if the service channel is arrange to forward the result information and/or event to another service channel, control may loop back to block 1304; otherwise, control may be flow block 1314. In at least one of the various embodiments, if the result information from block 1308 is forwarded to another service channel, the receiving service channel (a next service channel) may interpret the result information as an event and at take appropriate actions. Likewise, in at least one of the various embodiments, the event may be forwarded directly to a next service channel to enable it to process the event and generate additional result information.

In at least one of the various embodiments, as described above multiple service channels may be arranged into a process. Accordingly, in at least one of the various embodiments, if there are not any service channels remaining in the process the events may be considered consumed. Otherwise, the some or all of the results from the current service channel may be forwarded to another service channel comprising the process.

At block 1314, in at least one of the various embodiments, optionally, the result information from the process flow may be compiled and presented in a report that may be displayed to a user. In at least one of the various embodiments, the report information may be stored in a data base. In other embodiments, the report information may displayed in user-interface to the users.

Also, in at least one of the various embodiments, report information may include metrics relating to the operation of the process flow. Accordingly, in at least one of the various embodiments, such reports may include information such as, number of events processed, rate of events, type of events, kind of events, computing/storage resources used by the process flow, source of events, or the like, or combination thereof. In at least one of the various embodiments, some or all of the report information may be displayed in a dashboard view user-interface that summarizes the operation of the process flow and/or its service channels. Next, control may be return to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

Illustrative Use Cases

Figure 14:
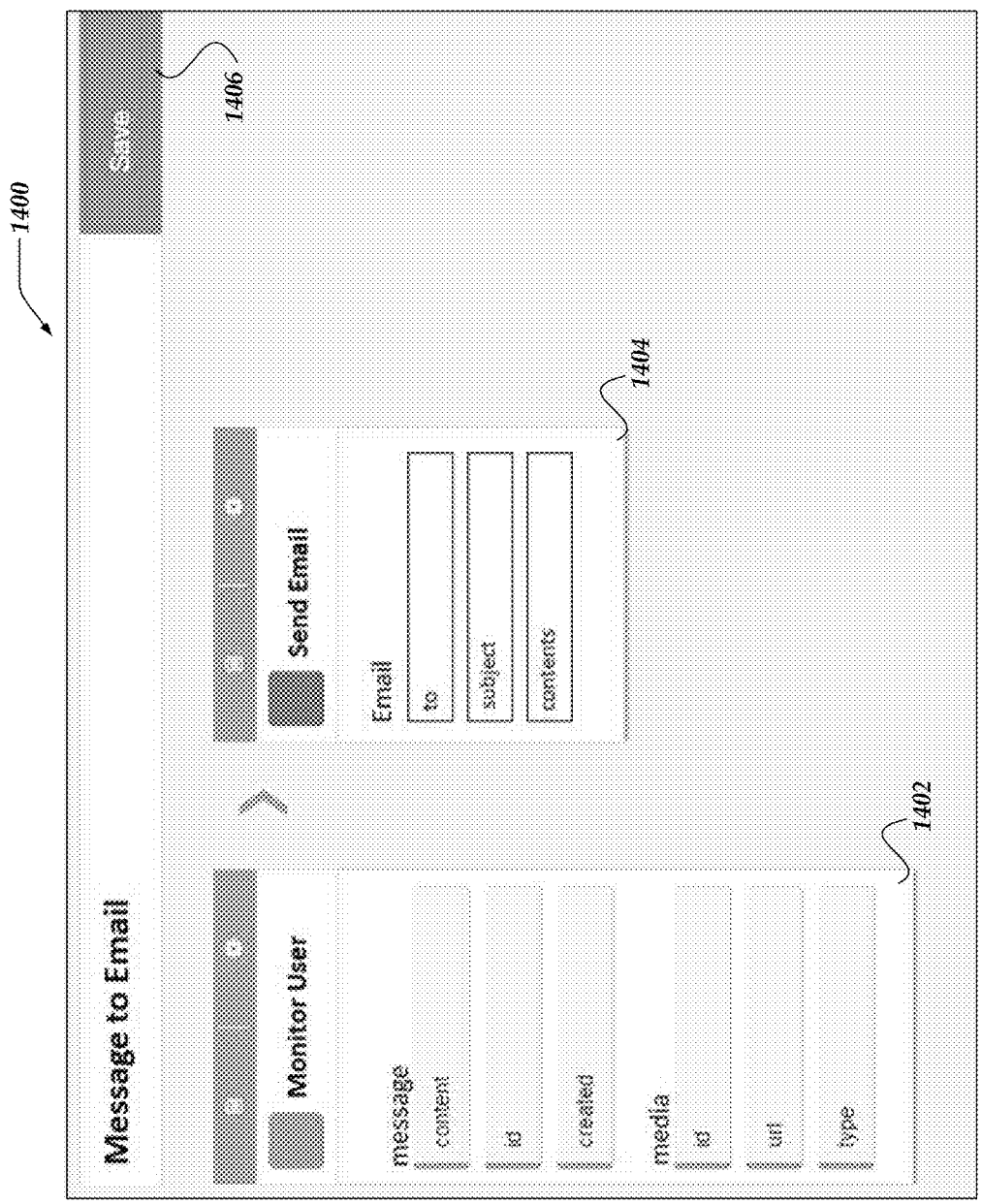
FIG. 14 may be illustrative of a user-interface for designing process flows in accordance with at least one of the various embodiments.
Figure 15:
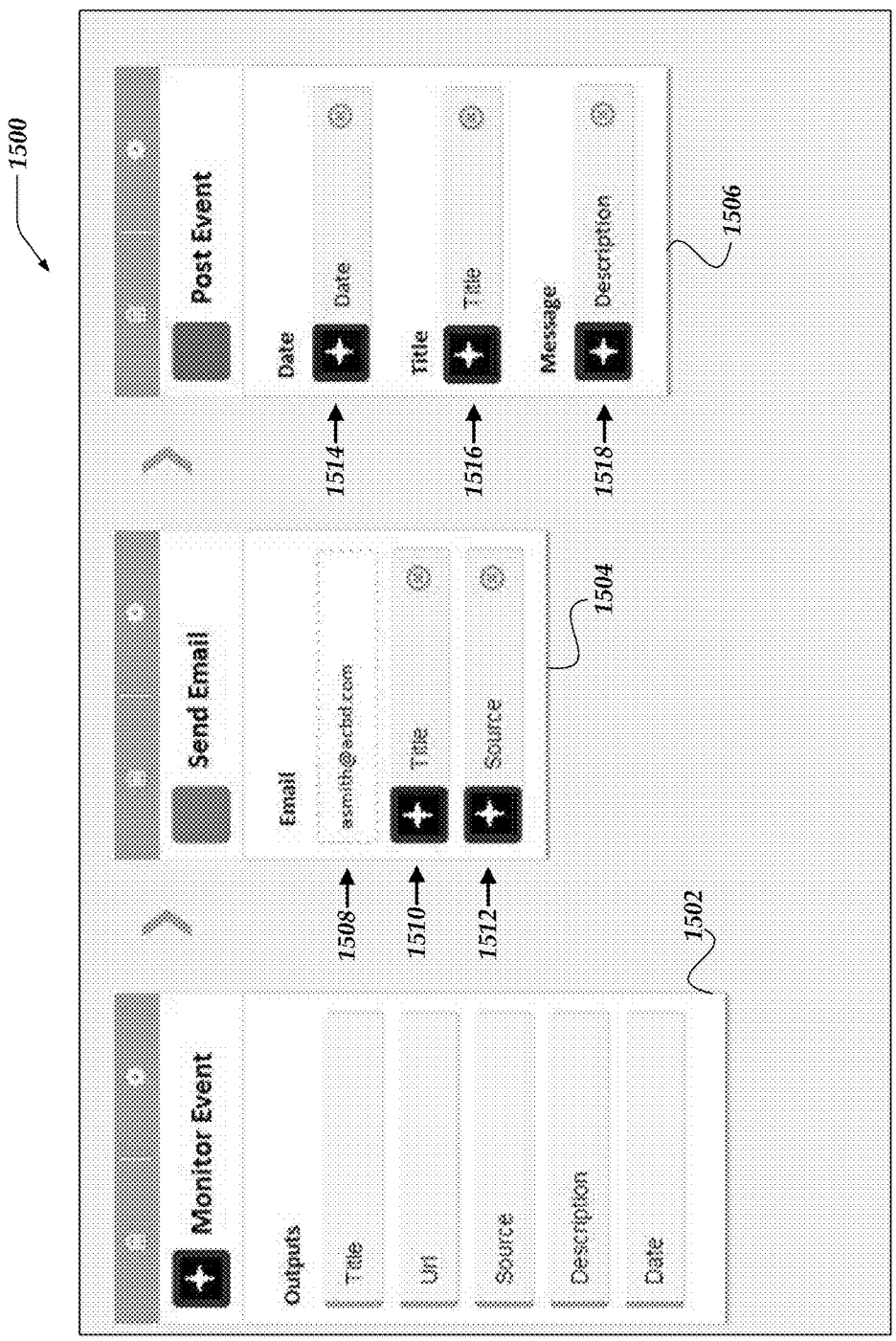
FIG. 15 may be illustrative of a user-interface for designing process flows in accordance with at least one of the various embodiments.

FIGS. 14-15 represent user-interface use cases for integration of cloud-based services to create custom business processes in accordance with at least one of the various embodiments. In at least one of the various embodiments, user-interfaces other than those represented in FIGS. 14-15 may be employed without departing from the spirit and/or scope of the claimed subject matter. Accordingly, user-interfaces may have more or fewer user-interface elements which may be arranged in various ways. In some embodiments, user-interfaces may be provided by web pages, desktop applications, mobile applications, or the like. In at least one of the various embodiments, flow designer application 321, process flow application 318 may include modules, processes and/or API's for enabling the generation of user-interfaces, such as, those represented in FIGS. 14-15.

FIG. 14 may be illustrative of a user-interface for designing flow 1400 in accordance with at least one of the various embodiments. In at least one of the various embodiments, a flow designer application may provide user-interfaces for designing as process flow. In this example, each service channel is represented using a service channel card. Accordingly, for this example, service channel card 1402 may be associated with a service that enables users to send and/or broadcast public messages. In this example, service channel card 1402 includes flow fields, such as, message content, message id, message created data. Also, in this example, card 1402 may include flow fields that may correspond to media attachments that may be included in the message. Further, in this example, service channel card 1402 is titled "Monitor User." Accordingly, there may be one or more configuration fields (on the back of card 1402) that may enable a user to provide a user identifier such that messages sent by that user are reported as events.

In at least one of the various embodiments, process flows may be arranged to connect one or more service channels together. In this example, service channel card 1404 may represent a second service channel that may be connected to service channel card 1402. In this example, service channel card 1404 represents a service channel for an email service provider. In some embodiments, an email service channel may be arranged to receive information/events and send them to a configured email address. For example, card 1404 has flow fields for receiving information that may be added to an email that is sent to an email address. In this example, card 1404 has three flow fields, to (the recipient), subject (the subject line for the email), and contents. In some embodiments, the contents of the "to" field may be provided manually or it may be generated by another service channel.

In this example, the service channel cards in process flow 1400 are not connected. In at least one of the various embodiments, a user may select the flow fields in service channel card 1402 that may be mapped to the flow fields in service channel card 1404. For example, the message content flow field in service channel card 1402 may be mapped to the contents flow field in service channel card 1404. Note, these is no requirement to map flow fields to a particular target flow field. As long as the target flow field is arranged to accept input, an input flow field may be mapped to it.

Accordingly, in at least one of the various embodiments, if data type conversions are required the flow designer application and/or process flow application may be arranged to perform the necessary conversions automatically. For example, in at least one of the various embodiments, a process flow application may be arranged by default to convert all field data into string data. However, in at least one of the various embodiments, the process flow application may perform dynamic type conversion as needed.

FIG. 15 may be illustrative of a user-interface for designing flow 1500 in accordance with at least one of the various embodiments. Flow 1500 may be an example of process flow that is ready to activate. In at least one of the various embodiments, flow 1500 includes three service channel cards for three different services. Service channel card 1502 represents a service channel card for monitoring a content stream, such as, results from a search engine, log file stream, event stream, or the like. Service channel card 1504 may represent an email service for sending emails if events occur. And, in this example, service channel card 1506 may represent a service channel for posting events to a list, such as, a social network news feed, electronic bulletin boards, or the like.

In this example, flow 1500 includes three service channels that have been mapped to produce the process flow. In this example, flow field from service channel card 1502 are mapped to flow fields in service channel card 1504. Flow field 1510 is arranged to be provided to the event title information as presented by service channel card 1502. Likewise, in this example, flow field 1512 is configured to receive information from the source flow field of service channel card 1502. However, flow field 1508 is manually configured to define an email address of the recipient. Accordingly, in this example, when flow 1500 is active, each event provided by service channel card 1502 may result in, or otherwise trigger, service channel card 1504 to send an email. The email sent by the service channel associated with service channel card 1504 (an email service) may include a subject line (flow field 1510) corresponding to the title flow field of card 1502 and the contents of the email (flow field 1512) may include the contents of card 1502.

Continuing with this example, service channel card 1506 may also include flow fields that are from service channel card 1502. Accordingly, in this example, flow field 1514 accepts a date from card 1502, flow field 1516 accepts the title from card 1502, and flow field 1518 accepts the description flow field from card 1502.

Accordingly, in at least one of the various embodiments, a process flow may be designed to map information from one service channel to one or more service channels. Depending on the design of the process flow, the information from events associated with one service channel may be mapped to one or more other service channels. In some embodiments, the mapping may be between sequential service channel cards in the process flow. In other embodiments, the mapping may be in parallel, such as shown in FIG. 15.

What is claimed as new and desired to be protected by Letters Patent of the United States is:

1. A method for managing online computer services using a network computer that includes a plurality of processors, wherein one or more of the processors execute logic to perform actions, comprising:

instantiating a display of a plurality of card user-interfaces, wherein each card user-interface corresponds to one of a plurality of service channels for a process flow, and wherein each card user interface includes a configuration back side of a visual representation of a card that displays and provides editable configuration information for a corresponding service channel and further includes an opposite flow front side of a visual representation of the same card that displays one or more output flow fields, and wherein each card user-interface flips the visual representation of the card to the flow front side only after enough edits occur to the configuration information through the visual representation of the card's back side to define and bi-directionally map at least a portion of the one or more output flow fields to one or more input flow fields of the corresponding service channel on the configuration back side of the same card; and in response to providing event information to the process flow, the plurality of processors perform further actions for the plurality of service channels, including:

providing a portion of the event information to one or more input flow fields of one or more of the plurality of service channels, wherein configuration information for the one or more service channels is employed to determine the portion of the event information that is provided to the one or more service channels of the process flow;

providing result information to the one or more output flow fields of the one or more of the plurality of service channels based on the event information;

providing a coupling of the result information to one or more next input fields of one or more next service channels of the process flow from a separate portion of the plurality of service channels based on the result information; and employing the coupling of the one or more service channels to the one or more next service channels in a chain configuration to generate a custom version of the process flow for a user.

2. The method of claim 1, further comprising:
receiving data from one or more remote service provider computers; and
employing the data to provide configure one or more of the plurality of card user-interfaces.

3. The method of claim 1, wherein the result information is provided to the one or more input flow fields of the one or more next service channels, and wherein next result information is provided using the one or more next service channels based on the previously provided result information.

4. The method of claim 1, wherein the providing of the one or more next service channels further comprises identifying when the separate portion of the plurality of service channels are linked to one or more output flow fields of the one or more of the plurality of service channels.

5. The method of claim 1, further comprising:
communicating a request for meta-data to one or more remote service provider computers;
providing one or more configuration fields of the plurality of service channels based on meta-data provided by one or more remote service provider computers; and
enabling a user to configure the plurality of service channels using the one or more configuration fields.

6. The method of claim 1, further comprising:
displaying one or more configuration fields correspondent to the one or more of the plurality service channels, wherein the one or more configuration fields are displayed on a secondary display corresponding to a primary display for the one or more service channel card user-nterfaces; and
when configuration information is edited for the one or more configuration fields in the secondary display of the one or more of the service channel card user-interfaces, displaying the primary display of the one or more service channel card user-interfaces having one or more input flow fields or output flow fields that correspond to the one or more edited configuration fields.

7. A system for managing online computer services over a network, comprising:

a network computer, comprising:
a transceiver that communicates over the network;
a memory that stores logic; and
a plurality of processors, wherein one or more of the processors execute the logic to perform actions, including:

instantiating a display of a plurality of card user-interfaces, wherein each card user-interface corresponds to one of a plurality of service channels for a process flow, and wherein each card user interface includes a configuration back side of a visual representation of a card that displays and provides editable configuration information for a corresponding service channel and further includes an opposite flow front side of a visual representation of the same card that displays one or more output flow fields, and wherein each card user-interface flips the visual representation of the card to the flow front side only after enough edits occur to the configuration information through the visual representation of the card's back side to define and bi-directionally map at least a portion of the one or more output flow fields to one or more input flow fields of the corresponding service channel on the configuration back side of the same card; and in response to providing event information to the process flow, the plurality of processors perform further actions for the plurality of service channels, including:

providing a portion of the event information to one or more input flow fields of one or more of the plurality of service channels, wherein configuration information for the one or more service channels is employed to determine the portion of the event information that is provided to the one or more service channels of the process flow;

providing result information to the one or more output flow fields of the one or more of the plurality of service channels based on the event information;

providing a coupling of the result information to one or more next input fields of one or more next service channels of the process flow from a separate portion of the plurality of service channels based on the result information; and employing the coupling of the one or more service channels to the one or more next service channels in a chain configuration to generate custom version of the process flow for a user; and a client computer, comprising:
a transceiver that communicates over the network;
a memory that stores logic; and a plurality of processors, wherein one or more of the plurality of processors execute the logic to perform actions, including:
configuring the plurality of service channels; and
displaying the process flow on a display.

8. The system of claim 7, wherein one or more of the plurality of processors for the network computer perform further actions, including:
receiving data from one or more remote service provider computers; and
employing the data to configure one or more of the plurality of card user-interfaces.

9. The system of claim 7, wherein the result information is provided to the one or more input flow fields of the one or more next service channels, and wherein next result information is provided using the one or more next service channels based on the previously provided result information.

10. The system of claim 7, wherein the one or more of the plurality of processors for the network computer perform further actions, including:
communicating a request for meta-data to one or more remote service provider computers;
providing one or more configuration fields of the plurality of service channels based on meta-data provided by one or more remote service provider computers; and
enabling a user to configure the plurality of service channels using the one or more configuration fields.

11. The system of claim 7, wherein the one or more of the plurality of processors for the client computer perform further actions, including:
displaying one or more configuration fields correspondent to the one or more of the plurality service channels, wherein the one or more configuration fields are displayed on a secondary display corresponding to a primary display for the one or more service channel card user-interfaces; and
when configuration information is edited for the one or more configuration fields in the secondary display of the one or more of the service channel card user-interfaces, displaying the primary display of the one or more service channel card user-interfaces having one or more input flow fields or output flow fields that correspond to the one or more edited configuration fields.

12. A processor readable non-transitory storage media that includes logic for managing online computer services, wherein one or more of a plurality of processors execute the logic to perform actions, comprising:
instantiating a display of a plurality of card user-interfaces, wherein each card user-interface corresponds to one of a plurality of service channels for a process flow, and wherein each card user interface includes a configuration back side of a visual representation of a card that displays and provides editable configuration information for a corresponding service channel and further includes an opposite flow front side of a visual representation of the same card that displays one or more output flow fields, and wherein each card user-interface flips the visual representation of the card to the flow front side only after enough edits occur to the configuration information through the visual representation of the card's back side to define and bi-directionally map at least a portion of the one or more output flow fields to one or more input flow fields of the corresponding service channel on the configuration back side of the same card; and in response to providing event information to the process flow, the plurality of processors perform further actions for the plurality of service channels, including:
providing a portion of the event information to one or more input flow fields of one or more of the plurality of service channels, wherein configuration information for the one or more service channels is employed to determine the portion of the event information that is provided to the one or more service channels of the process flow;
providing result information to the one or more output flow fields of the one or more of the plurality of service channels based on the event information;
providing a coupling of the result information to one or more next input fields of one or more next service channels of the process flow from a separate portion of the plurality of service channels based on the result information; and
employing the coupling of the one or more service channels to the one or more next service channels in a chain configuration to generate a custom version of the process flow for a user.

13. The media of claim 12, further comprising:
receiving data from one or more remote service provider computers; and
employing the data to provide configure one or more of the plurality of card user-interfaces.

14. The media of claim 12, wherein the result information is provided to the one or more input flow fields of the one or more next service channels, and wherein next result information is provided using the one or more next service channels based on the previously provided result information.

15. The media of claim 12, wherein the providing of the one or more next service channels further comprises identifying when the separate portion of the plurality of service channels are linked to one or more output flow fields of the one or more of the plurality of service channels.

16. The media of claim 12, further comprising:
communicating a request for meta-data to one or more remote service provider computers;
providing one or more configuration fields of the plurality of service channels based on meta-data provided by one or more remote service provider computers; and
enabling a user to configure the plurality of service channels using the one or more configuration fields.

17. The media of claim 12, further comprising:
displaying one or more configuration fields correspondent to the one or more of the plurality service channels, wherein the one or more configuration fields are displayed on a secondary display corresponding to a primary display for the one or more service channel card user-interfaces; and
when configuration information is edited for the one or more configuration fields in the secondary display of the one or more of the service channel card user-interfaces, displaying the primary display of the one or more service channel card user-interfaces having one or more input flow fields or output flow fields that correspond to the one or more edited configuration fields.

18. A network computer for managing online computer services, comprising:
a transceiver that communicates over the network;
a memory that stores logic; and a plurality of processors, wherein one or more of the processors execute the logic to perform actions, including:
instantiating a display of a plurality of card user-interfaces, wherein each card user-interface corresponds to one of a plurality of service channels for a process flow, and wherein each card user interface includes a configuration back side of a visual representation of a card that displays and provides editable configuration information for a corresponding service channel and further includes an opposite flow front side of a visual representation of the same card that displays one or more output flow fields, and wherein each card user-interface flips the visual representation of the card to the flow front side only after enough edits occur to the configuration information through the visual representation of the card's back side to define and bi-directionally map at least a portion of the one or more output flow fields to one or more input flow fields of the corresponding service channel on the configuration back side of the same card; and
in response to providing event information to the process flow, the plurality of processors perform further actions for the plurality of service channels, including:
providing a portion of the event information to one or more input flow fields of one or more of the plurality of service channels, wherein configuration information for the one or more service channels is employed to determine the portion of the event information that is provided to the one or more service channels of the process flow;
providing result information to the one or more output flow fields of the one or more of the plurality of service channels based on the event information;
providing a coupling of the result information to one or more next input fields of one or more next service channels of the process flow from a separate portion of the plurality of service channels based on the result information; and
employing the coupling of the one or more service channels to the one or more next service channels in a chain configuration to generate a custom version of the process flow for a user.

19. The network computer of claim 18, further comprising:
receiving data from one or more remote service provider computers; and
employing the data to provide configure one or more of the plurality of card user-interfaces.

20. The network computer of claim 18, wherein the result information is provided to the one or more input flow fields of the one or more next service channels, and wherein next result information is provided using the one or more next service channels based on the previously provided result information.

21. The network computer of claim 18, wherein the providing of the one or more next service channels further comprises identifying when the separate portion of the plurality of service channels are linked to one or more output flow fields of the one or more of the plurality of service channels.

22. The network computer of claim 18, further comprising:
communicating a request for meta-data to one or more remote service provider computers;
providing one or more configuration fields of the plurality of service channels based on meta-data provided by one or more remote service provider computers; and
enabling a user to configure the plurality of service channels using the one or more configuration fields.

23. The network computer of claim 18, further comprising:
displaying one or more configuration fields correspondent to the one or more of the plurality service channels, wherein the one or more configuration fields are displayed on a secondary display corresponding to a primary display for the one or more service channel card user-interfaces; and
when configuration information is edited for the one or more configuration fields in the secondary display of the one or more of the service channel card user-interfaces, displaying the primary display of the one or more service channel card user-interfaces having one or more input flow fields or output flow fields that correspond to the one or more edited configuration fields.

* * * * *